April 26, 1966 R. E. WELLS 3,248,525
AUTOMATIC BOOKMAKER MACHINE
Filed Aug. 7, 1961 21 Sheets-Sheet 1
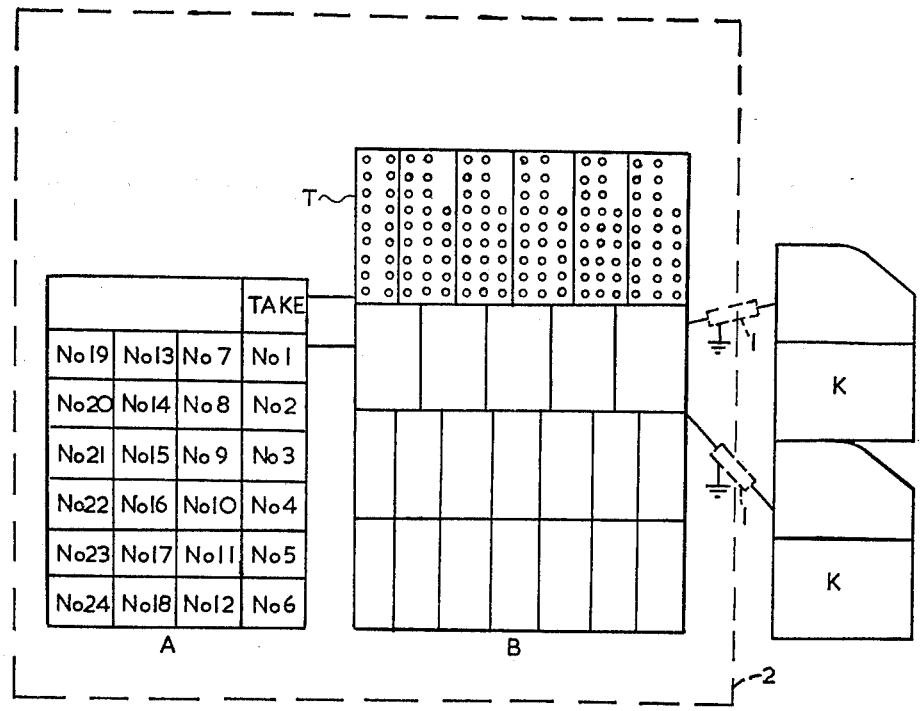
FIG. 1
FIG. 2
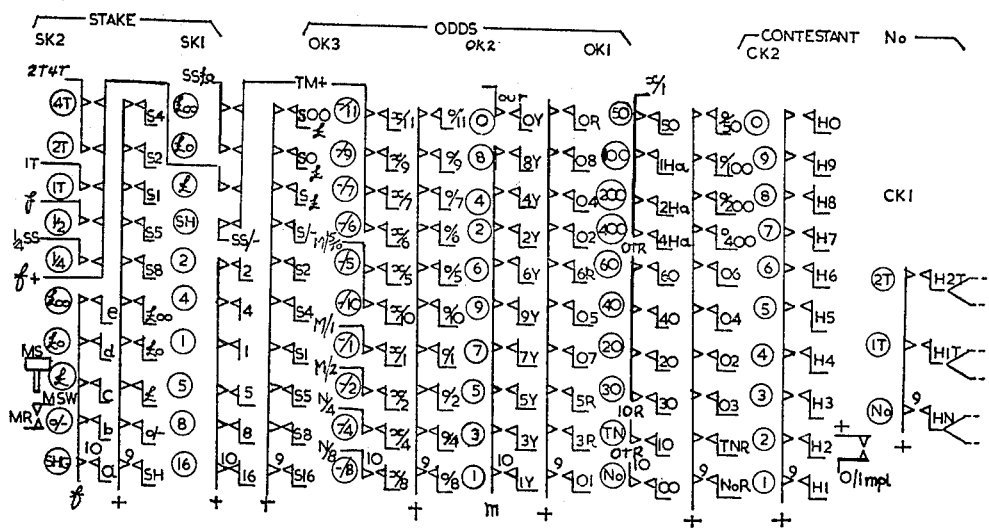

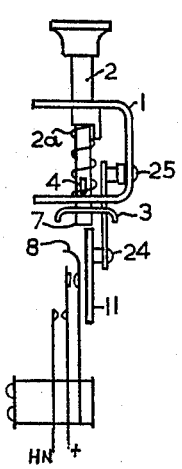
FIG. 4
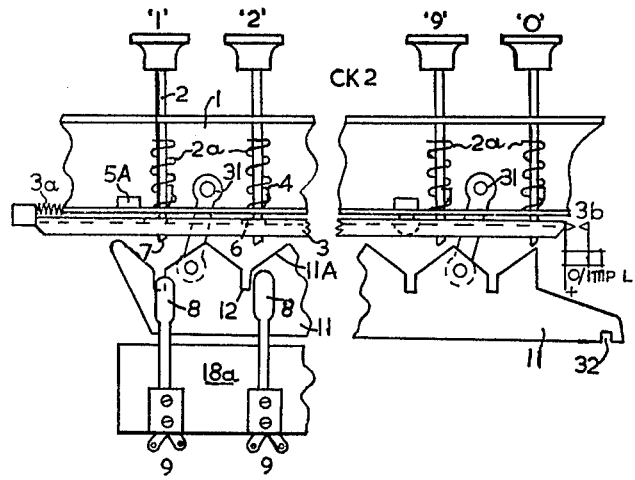
FIG. 3
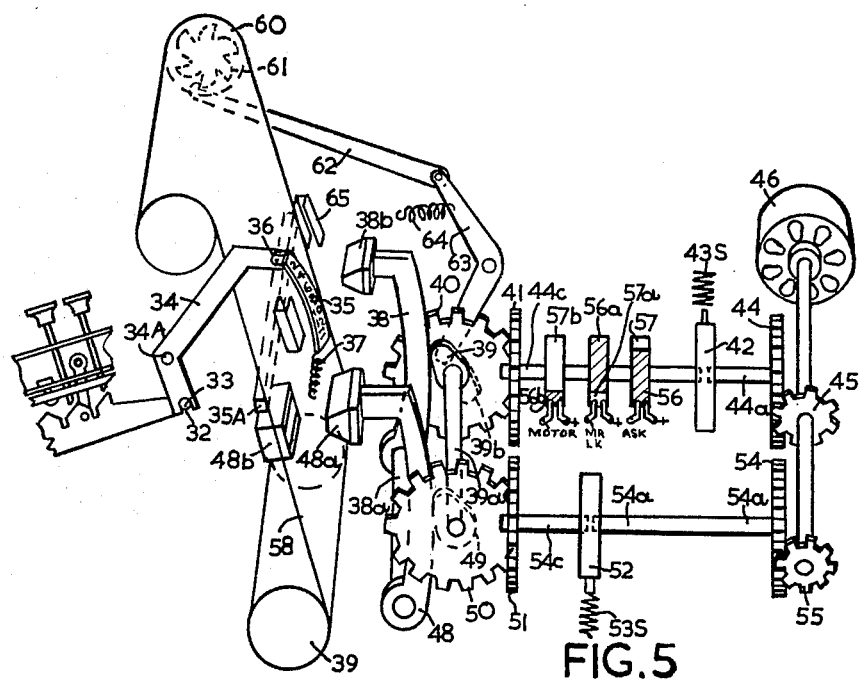
FIG. 5
FIG. 6

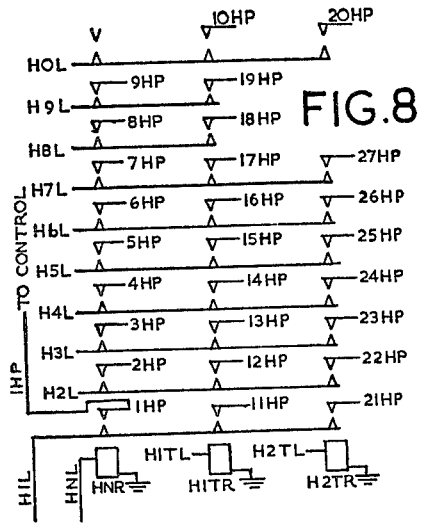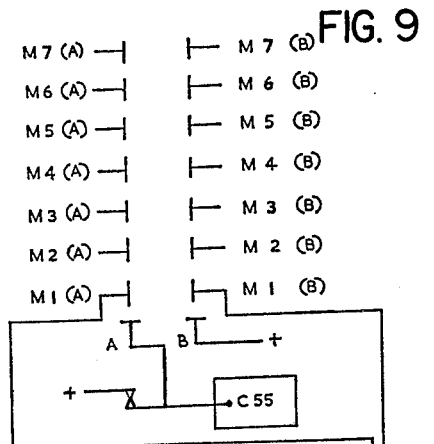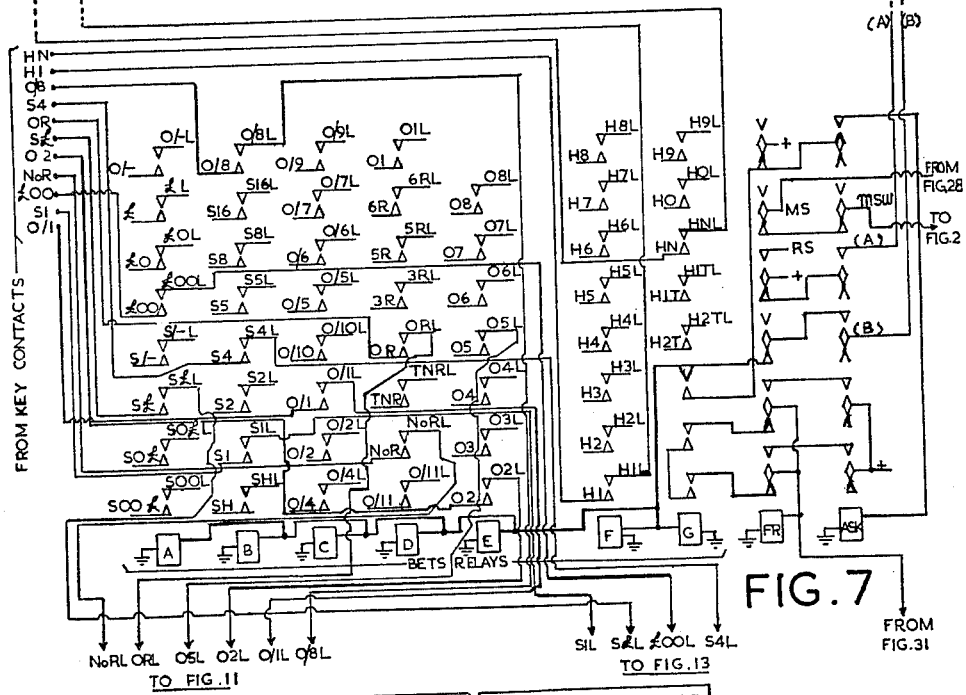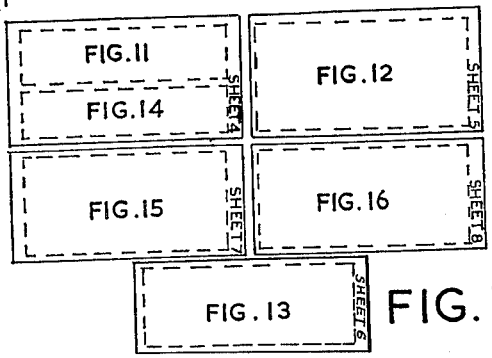

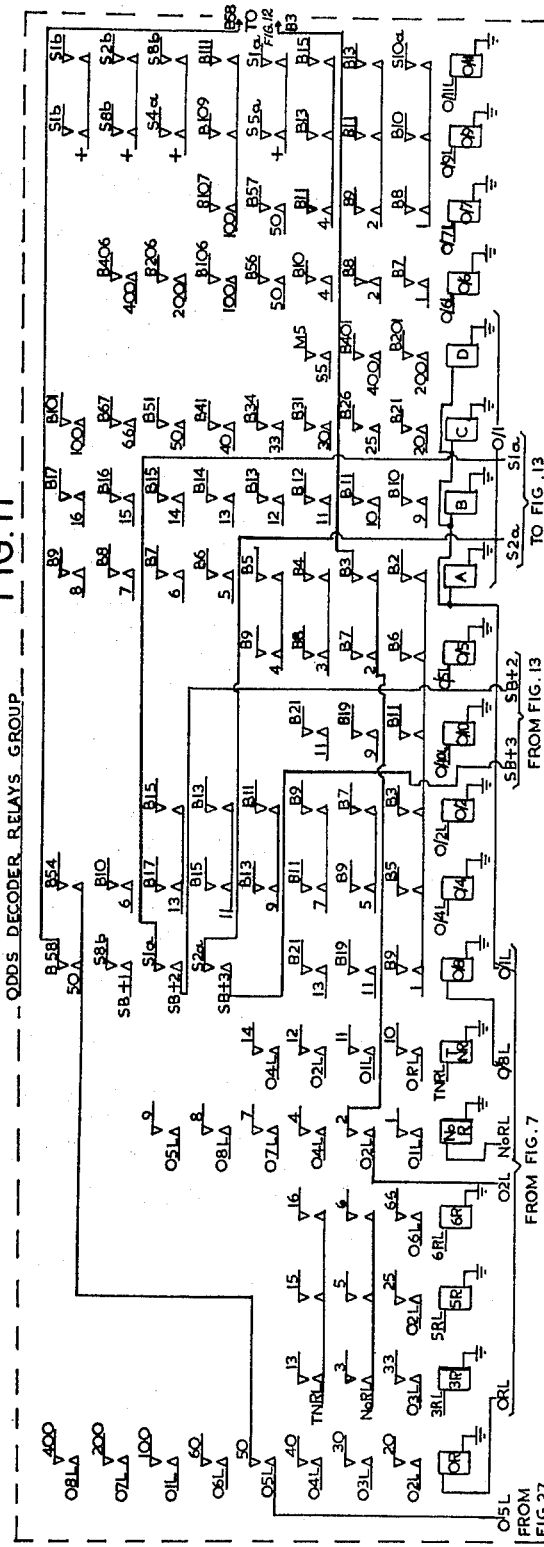

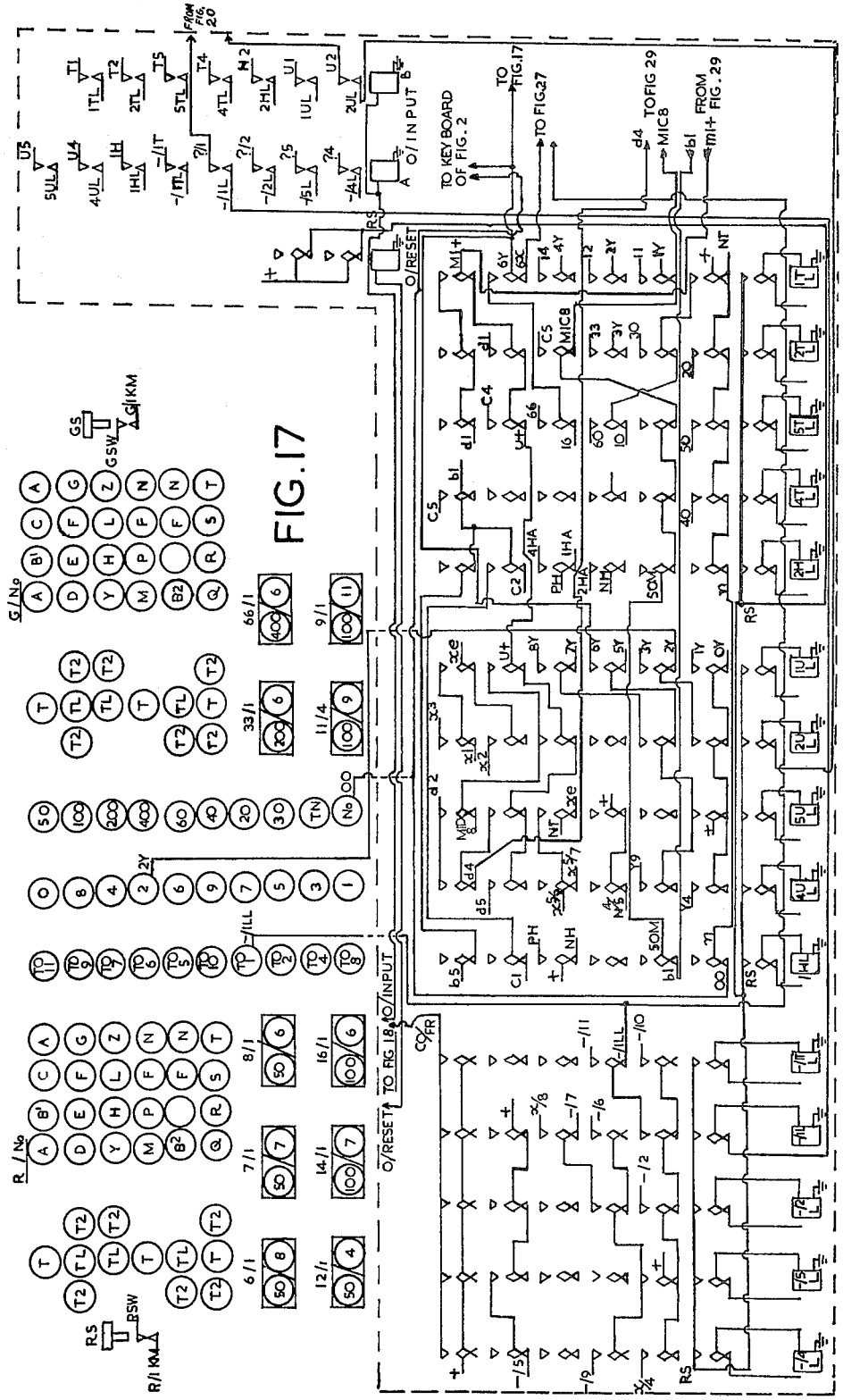

April 26, 1966  R. E. WELLS  3,248,525
AUTOMATIC BOOKMAKER MACHINE
Filed Aug. 7, 1961  21 Sheets-Sheet 10

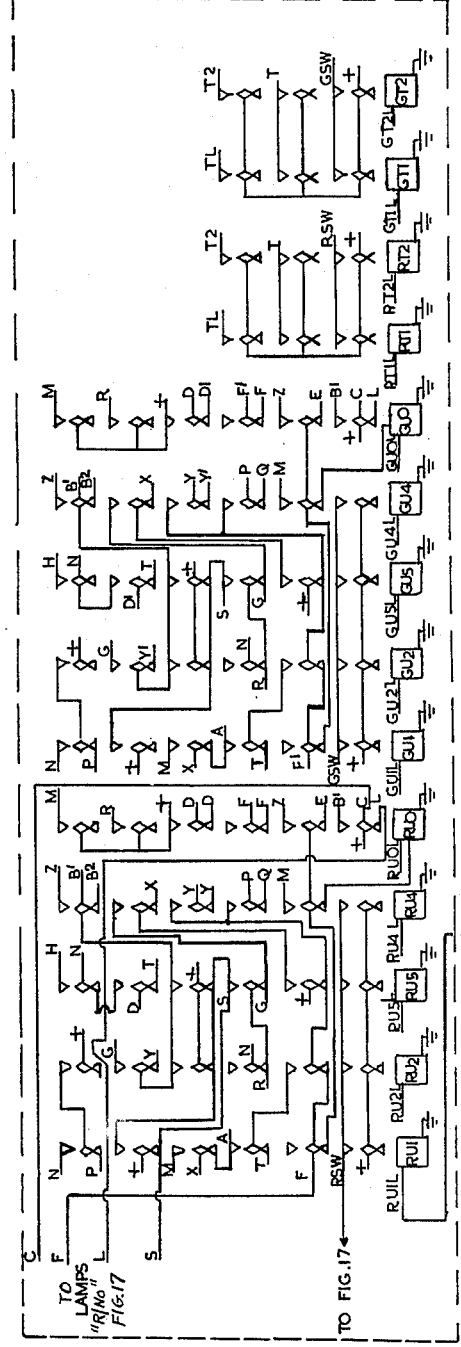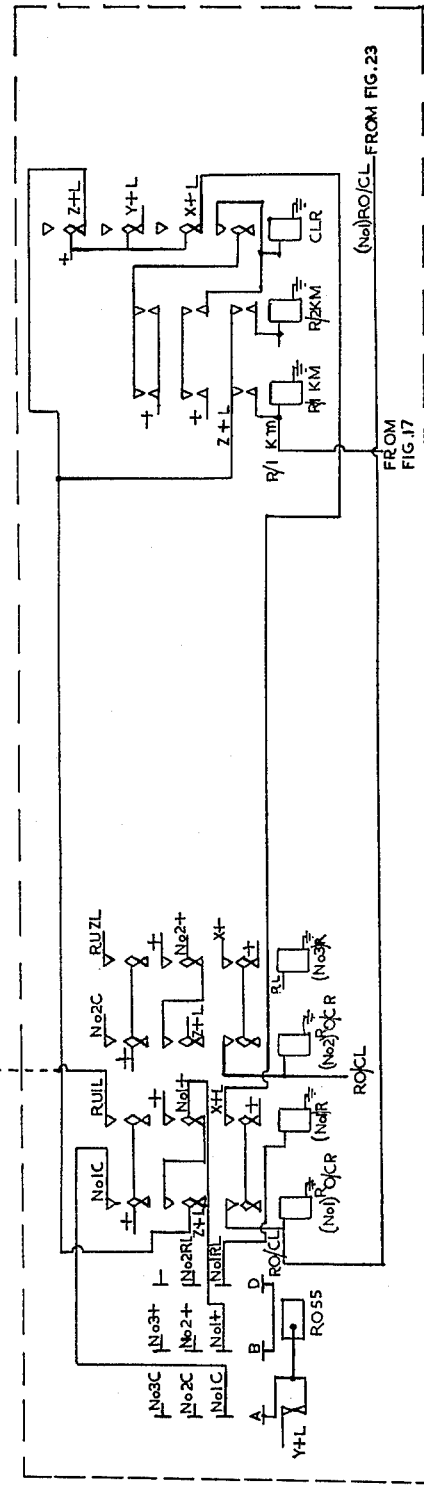

April 26, 1966 R. E. WELLS 3,248,525
AUTOMATIC BOOKMAKER MACHINE
Filed Aug. 7, 1961 21 Sheets-Sheet 16

FIG. 27
FIG. 28
FIG. 29

April 26, 1966   R. E. WELLS   3,248,525
AUTOMATIC BOOKMAKER MACHINE
Filed Aug. 7, 1961   21 Sheets-Sheet 19

April 26, 1966  R. E. WELLS  3,248,525
AUTOMATIC BOOKMAKER MACHINE
Filed Aug. 7, 1961  21 Sheets-Sheet 21

United States Patent Office 3,248,525
Patented Apr. 26, 1966

3,248,525
AUTOMATIC BOOKMAKER MACHINE
Roy Ernest Wells, 4 Day St., Lidcombe,
New South Wales, Australia
Filed Aug. 7, 1961, Ser. No. 146,389
Claims priority, application Australia, Aug. 10, 1960,
63,413/60
5 Claims. (Cl. 235—92)

This invention relates to apparatus for receiving and registering betting wagers, particularly those involving bets placed at advertised odds. It is proposed that basically the apparatus provide facilities for accepting wagers placed at one or more betting locations on one or more participants in an intended contest.

In such places as race courses and elsewhere where gambling occurs on the expected outcome of a contest it is usual for the wagers to be accepted by numerous bookmakers dispersed around the course. Betting transactions at each position, and particularly such aspects of the betting as the value of the displayed or advertised odds of contestants and the acceptable maximum values of wagers at those odds, are under the control of an individual bookmaker. A clerk is invariably employed by each bookmaker to record the relevant statistics of each wager and additionally to provide the bookmaker at any instant with an indication of the state of his "book," that is how much money the bookmaker stands to win or lose in the event of any particular contestant being subsequently successful.

To enable this information to be readily supplied, the betting sheet for each contest, which is kept by the clerk, contains separate sections for each contestant with each section itemising the following statistics—(1) the individual stake involved in each wager, (2) the individual "collect," being the amount payable, for each wager should it win, (3) the total stakes involved in all bets on that contestant, being an accumulation of all the individual stakes, (4) the total potential payout for a contestant, being an accumulation of the individual collects, and commonly called the "Pay," and (5) the identifying serial number for the wager. Additionally a separate item of information is kept by the clerk which is referred to as the "Take," that being (6) an accumulation of the individual stakes in respect to all wagers in the contest. It will be appreciated that item (2) above is arrived at by the clerk or the bookmaker by multiplying the stake by the odds and including the stake for return to the customer. Furthermore, by comparision of item (4) in respect of each contestant with item (6) the bookmaker is provided with a ready reference as to the state of his book on each contestant, that is the potential loss or gain concerning the betting transactions up to that time. From this information the bookmaker at each betting position may be constantly varying the odds advertised for each contestant so as to guarantee him a predetermined profit despite the changing degrees of favouritism of the contestants.

It is the principal object of the invention to provide apparatus for accepting wagers at one or more betting positions, in which apparatus particulars of all betting transactions are relayed to a central location where, either manual, semi automatic or fully automatic control of the betting at all positions throughout the race course or other arena can be exercised.

A further object is to provide at each betting position an operator's machine which through key manipulation will register relevant statistics of each wager accepted by the apparatus.

Another object is to provide automatic equipment at the central location for computing, and providing an indication of, the total values of certain of the betting statistics whereby the state of the "book" may be readily ascertained.

Yet another object is to provide means for automatically adjusting the betting odds to be offered for each contestant in response to the total values of the betting statistics.

A main feature of the invention consists of apparatus for accepting wagers at advertised betting odds on participants in a projected contest, the apparatus comprising at least one keyboard machine each machine being at a respective betting position, and a control unit at a central location linked with all of the keyboard machines, each keyboard machine having keys arranged so as to relay to the control unit information at least as to the identifying number of the participant and as to the value of the wager, and the control unit having means for automatically computing from the information received from each keyboard machine the total value of money in stakes wagered on the contest and the total value of money payable in winning wagers for each individual participant in the event of that participant winning the contest, whereby from a comparison of each said payable total with the said stakes total the potential profit from the betting transactions may be obtained.

Another feature provides apparatus for accepting wagers at advertised betting odds on participants in a contest, a keyboard machine comprising columns of keys arranged in at least three groups, there being a group for keying an identification number of a participant, a group for keying the betting odds associated with a wager, and a group for keying the stakes associated with a wager, electrical contacts operable by key manipulation, electrical circuitry connected with said contacts for generating signals representative of the statistics of a wager keyed on the machine, and a manual switch operable to provide for transmission of said signals to a remote location.

A further feature provides apparatus for accepting wagers at advertised betting odds on participants in a contest, an arrangement for altering the betting odds on a participant automatically in response to increases and decreases at any time during betting transactions in the potential profit to be made by the apparatus in the event of the said participant subsequently winning the contest, the arrangement comprising means for obtaining a signal representative of the said profit, a signal responsive odds determining device, an alarming unit to provide an indication of the presence of abnormal conditions of the said betting transactions, a relaying unit to receive the said signal representative of the profit and to send an operating signal to the said odds determining device and to the alarming unit, said alarming unit being operated over an energization path having interrupting stages in sequence, and means responsive to said operating signals if successively repeated to indicate continued loss for completing the said path through each of said stages.

Yet another feature provides a system for accumulating and storing values applied to the system in terms of a code having elements of the order of 4, 2 and 1, two cascade connected bi-stable devices, an input circuit individual to each said device, means for applying respectively to the two said input circuits signals representative of the two elements of lowest order of the said code, a counting device, an input circuit to said counting device, means for applying signals representative of the element of highest order of the said code to the input circuit to said counting device, a connection between the output of the bi-stable device which receives the signals of the 2 element of the said code and the input circuit of the said counting device, means responsive to each second change of state of each said bi-stable device for signalling to the following device the value registered therein in terms of an element of the next highest order, and means for reading out of the system the total value stored in all said devices.

Another feature provides a system for accumulating and storing values applied to the system in terms of a code having elements of the order of 4, 2 and 1, two cascade connected bi-stable devices, an input circuit individual to each said device, means for applying respectively to the two said input circuits signals representative of the two elements of lowest order of the said code, a counting device, an input circuit to said counting device, means for applying signals representative of the element of highest order of the said code to the input circuit to said counting device whereby the counting device steps on one step for each 4 element signal received, a connection between the output of the bi-stable device which receives the signal representative of the 2 element of the said code and the input circuit of the said counting device whereby the bi-stable device which receives signals representative of the 1 element of said code sends with each second change of its state a signal representative of the 2 element to the following bi-stable device and the said following bi-stable device sends with each second change of its state a signal representative of the 4 element to the counting device, and means in the bi-stable devices and the counting device for reading out of the system the total value stored.

Another feature provides a system including N bi-stable devices connected in cascade for accumulating and storing values applied to the system in terms of a code having $N+1$ elements each of which is a multiple of the element of lower order, an individual input circuit for each bi-stable device and means for applying through the input circuit to each of said bi-stable devices signals representative of an individual order to the said code elements, the said elements being assigned from the lowest order to the second highest order consecutively to the input circuits of the first to the Nth bi-stable devices, respectively, a counting device, an input circuit for said counting device, means for applying signals representative of the element of highest order of the said code to the input circuit to said counting device, a connection from the Nth bi-stable device to the input circuit of the counting device whereby the said counting device adds the number of signals received which are representative of elements of the highest order of the said code, means responsive to each second change of state of each said bi-stable device for signalling to the following device the value registered therein in terms of an element of the next highest order, and means in each bi-stable device and the counting device for reading out of the system the total value stored.

The invention also consists of the feature of an accumulating and storage register comprising a register section having sequentially connected bi-stable devices, and individual to each said device an input circuit for signals representing an individual one of a plurality of denominations of input units, each of said bi-stable devices operating upon its second change of state to transmit to the input circuit of the following bi-stable device in the sequence a signal representative of the input unit of the next highest denomination.

Yet a further feature provides a system for accumulating and storing values applied to the system in terms of a code having two elements of such a relationship that the one of higher order is less than a multiple of the other and differs therefrom by an amount equal to a common factor of both elements, a multi-position stepping switch, an input to said switch, means for applying signals representative of the element of lower order to the input to said stepping switch to cause said stepping switch to step on one step for each signal received, registering apparatus, an input to said registering apparatus, means for applying signals representative of the element of higher order to the input to said registering apparatus, the positions of the stepping switch being arranged in at least one group and equalling in number the multiples of the said common factor in the said element of higher order, a contact at each said position of the said group, connections to the input of the said registering apparatus from the contacts of all but the first of the positions in the said group whereby a signal is applied over each said connection to the said registering apparatus after the switch has stepped to each said connected contact, and means in the registering apparatus for reading out the total value registered therein.

A further feature provides a system for accumulating and storing values applied to the system in terms of a code composed of elements from two separate progression sequences with the element of lowest order of one sequence less than a multiple of the element of highest order of the other sequence but exceeding the last-mentioned element by an amount equal to a common factor of both said elements; two registering devices; means for applying to a first one of said registering devices signals representative of the said element of highest order and other elements of said other sequence, means for applying to a second one of said registering devices signals representative of the said element of lowest order and other elements of said one sequence, a multi-position stepping switch; means for applying to the said switch from the said first registering device signals representative of the said element of highest order to cause said switch to step on one step for each signal received; means for converting the value expressed in terms of the said element of highest order into terms of said element of lowest order of the said one sequence, said converting means comprising an arrangement of the positions of said stepping switch into at least one group there being as many positions in the said group as there are multiples of the said common factor in the said element of lowest order in the said one sequence, and a signalling connection from each said position excepting the first position of the said group to the said second registering device, and means in the said second registering device for reading out the total value.

These and further objects and features of the invention will become apparent from a reading of the following description with reference to the accompanying drawings in which:

FIG. 1 shows a block schematic representation of apparatus according to the invention which has two remote keyboard machines;

FIG. 2 shows the arrangement of keys on each keyboard machine with their associated contacts shown schematically alongside;

FIG. 3 is a side view of a column of keys, column CK2, showing their individual function;

FIG. 4 is an end view of the column of keys depicted in FIG. 3;

FIG. 5 illustrates in perspective the betting ticket printing mechanism which may be connected with the keys;

FIG. 6 shows an example of a betting ticket which may be printed by the mechanism of FIG. 5;

FIG. 7 depicts schematically a relay group at a keyboard machine position through which a signalling path may be obtained for relaying the statistics of a wager between the machine and the common control unit;

FIG. 8 shows a further relay group at the keyboard machine which responds to the keying of a contestant No. to connect into circuit at the control unit the Pay Accumulator individual to that No. of contestant. Provision is made in the contacts of this figure for a maximum number of 27 contestants, but this total may be increased, if desired;

FIG. 9 is a hunting type switch located at the control unit to ensure that a single keyboard machine at a time relays a wager to the control unit;

FIG. 10 is a keysheet showing the layout of some of the later drawings which go to make up the complete circuit of the Multiplier Equipment;

FIG. 11 depicts a first section of the Multiplier Equipment, viz. the Odds Decoder Relay Group;

FIG. 14 is of a fourth section called the Conversion Relay Groups;

Figure 15:
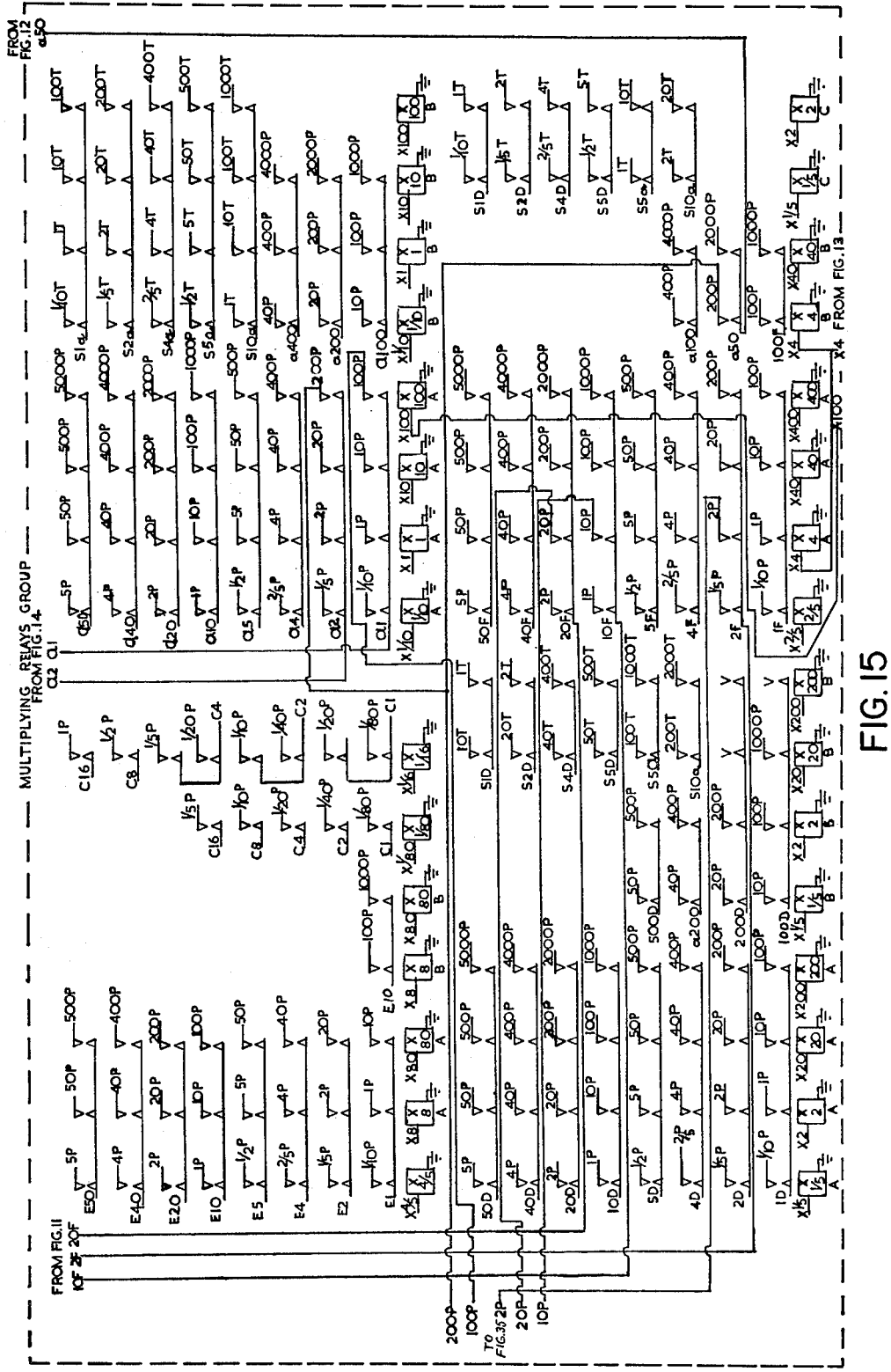
Figure 16:
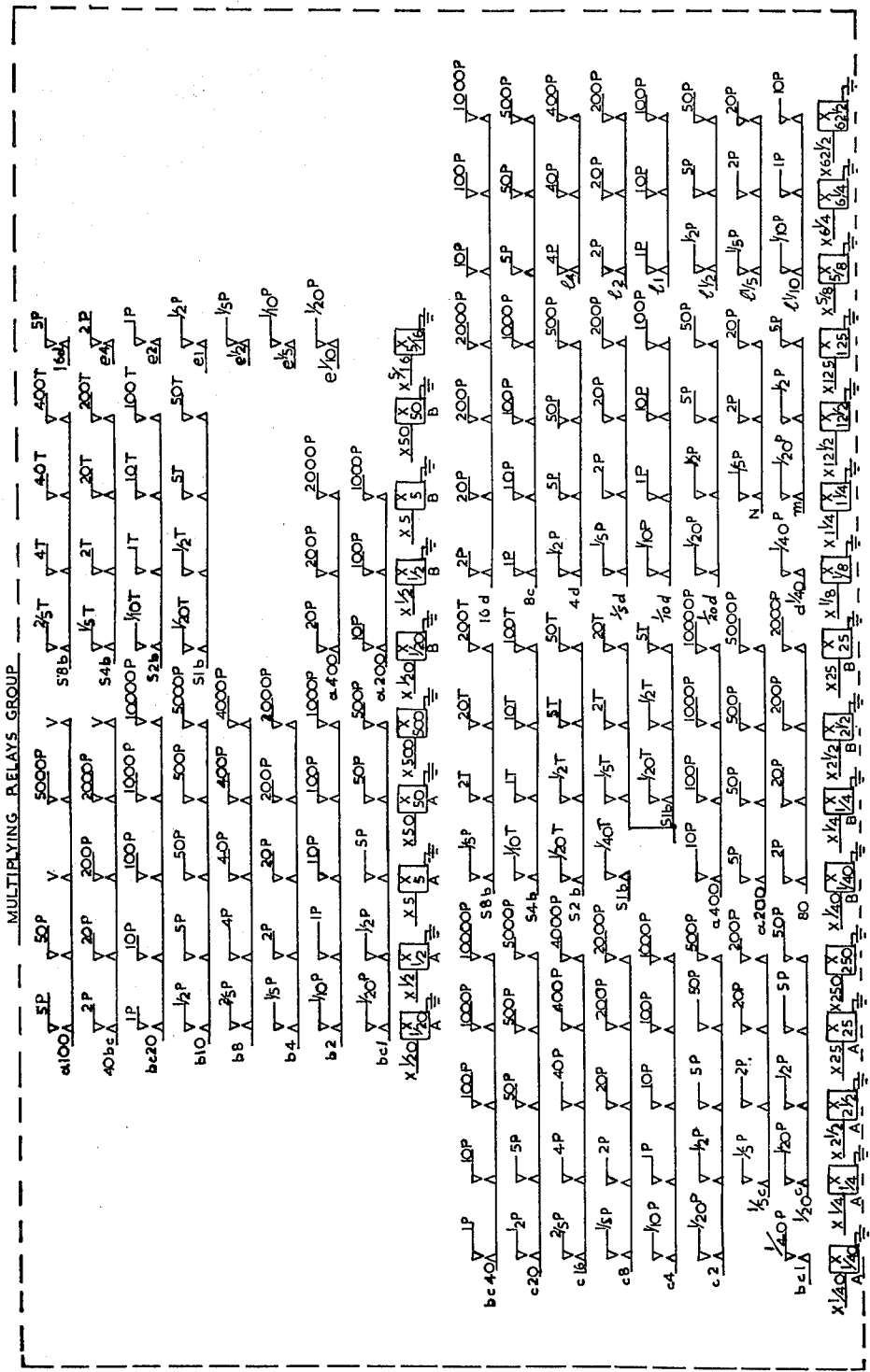
Figure 19:
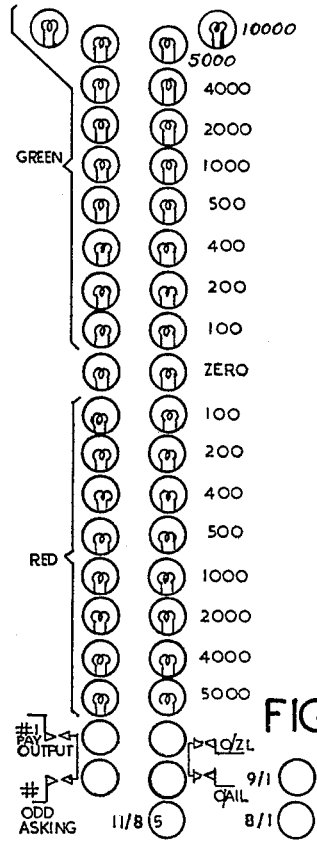
Figure 18:
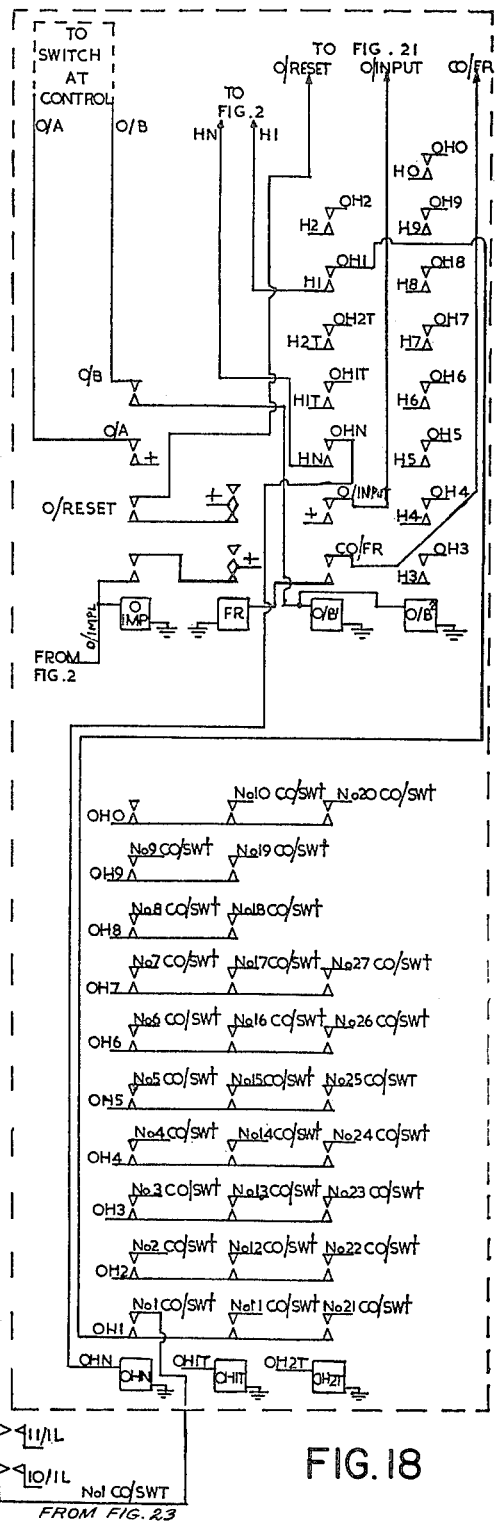
Figure 20:
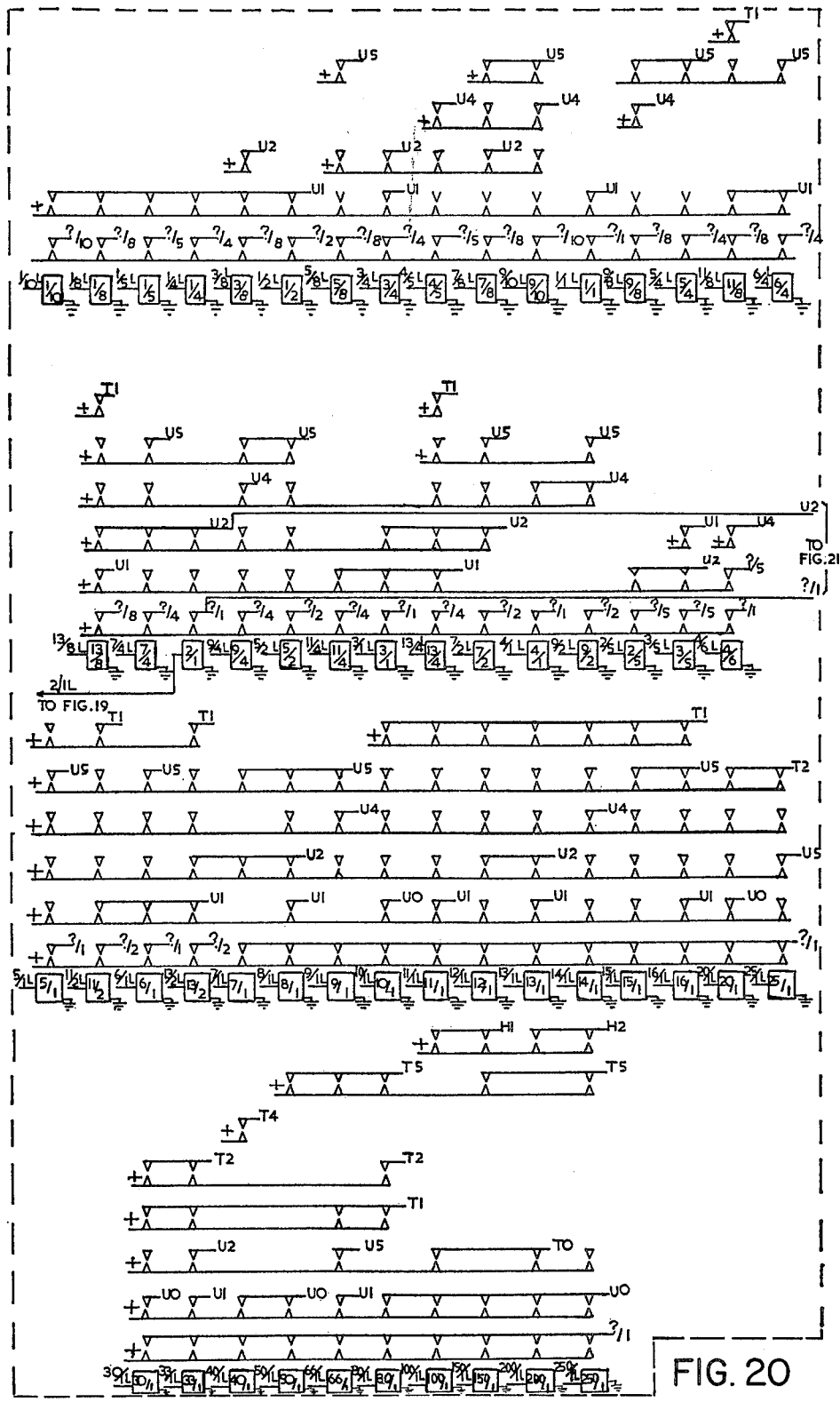
Figure 22:
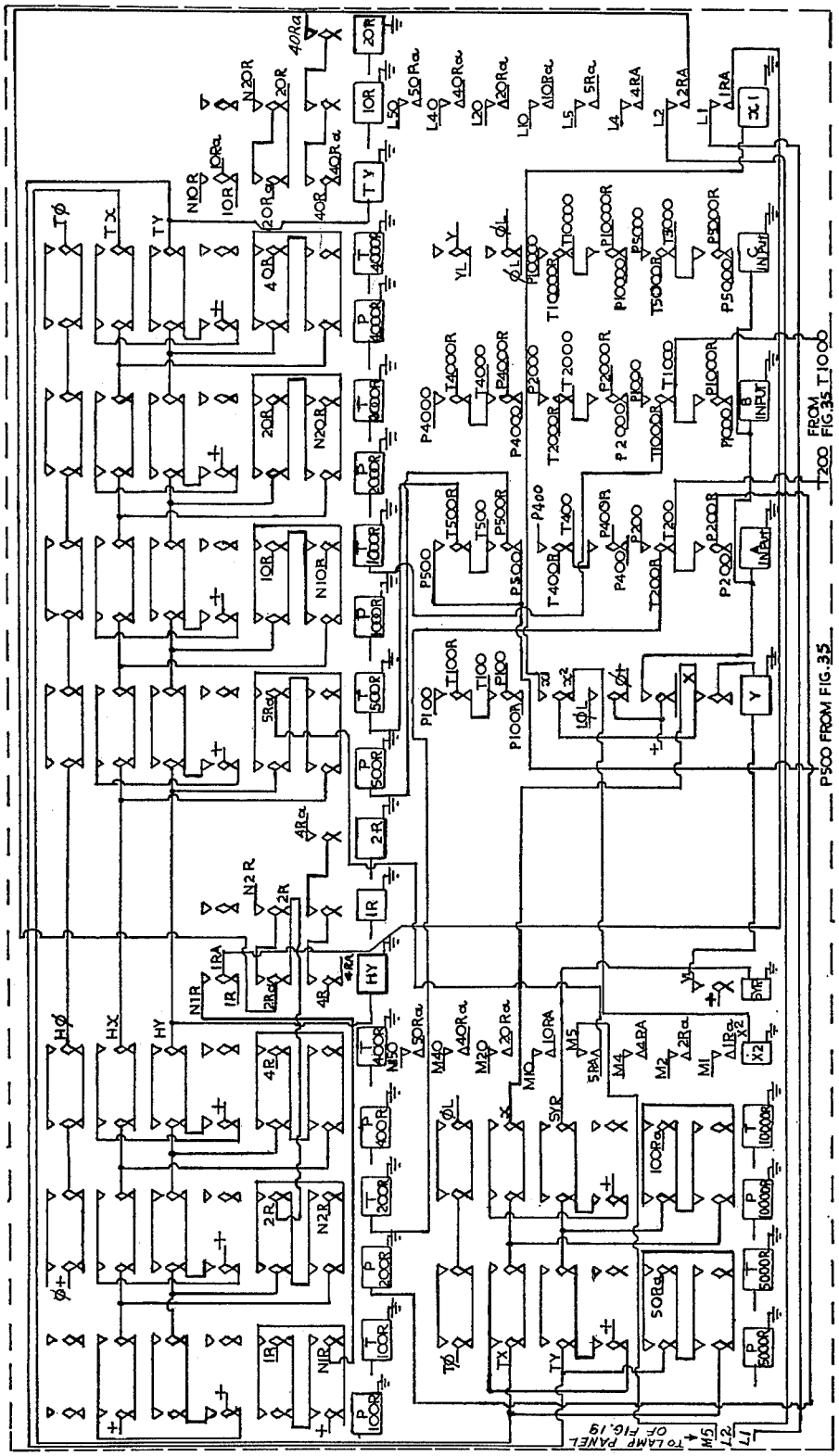
Figure 23:
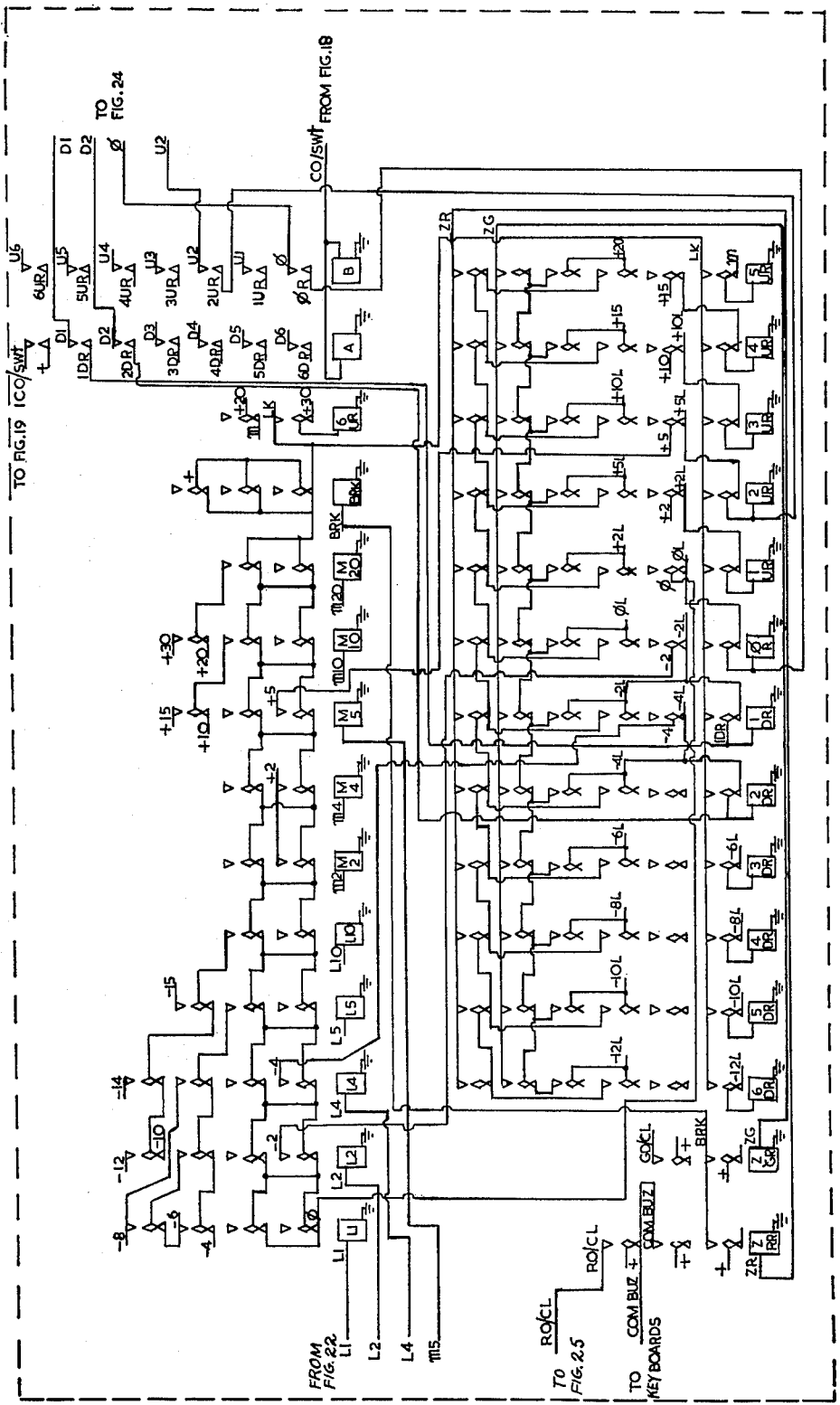
Figure 24:
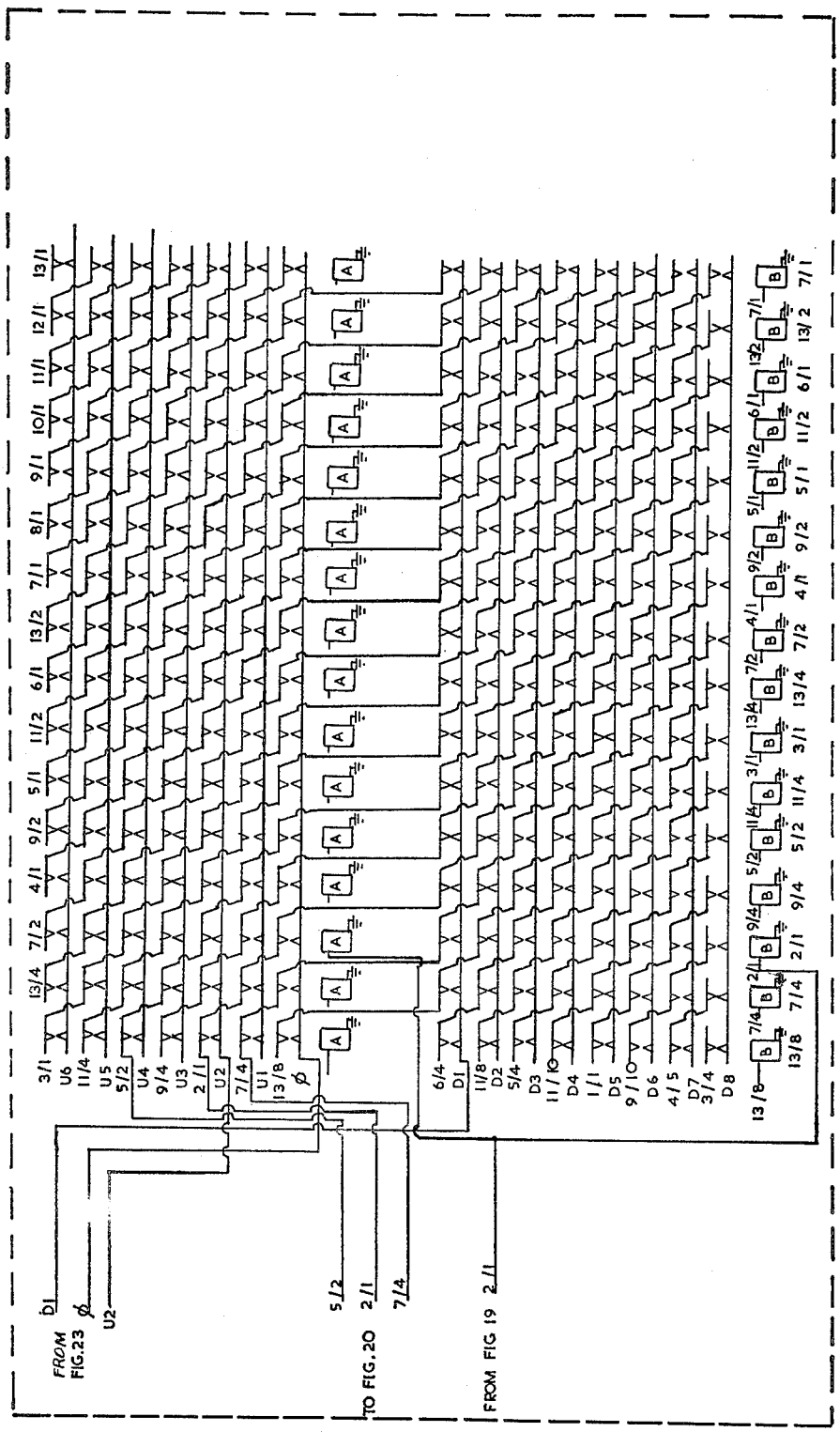
Figures 30, 32:
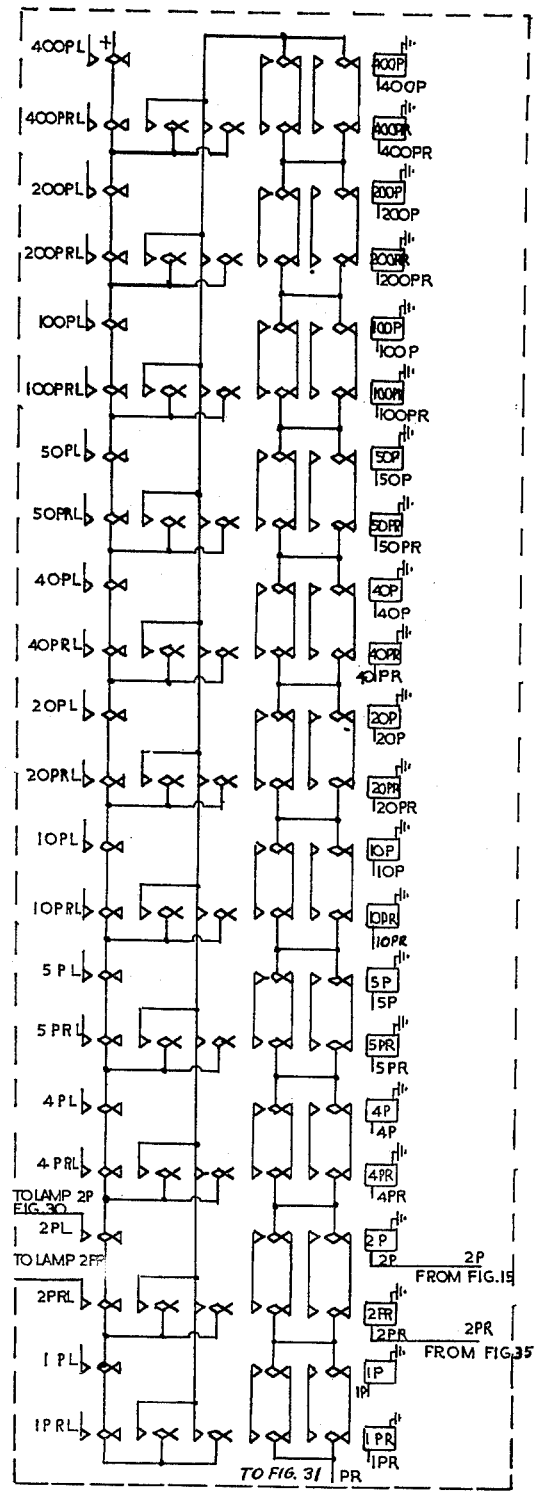
Figure 31:
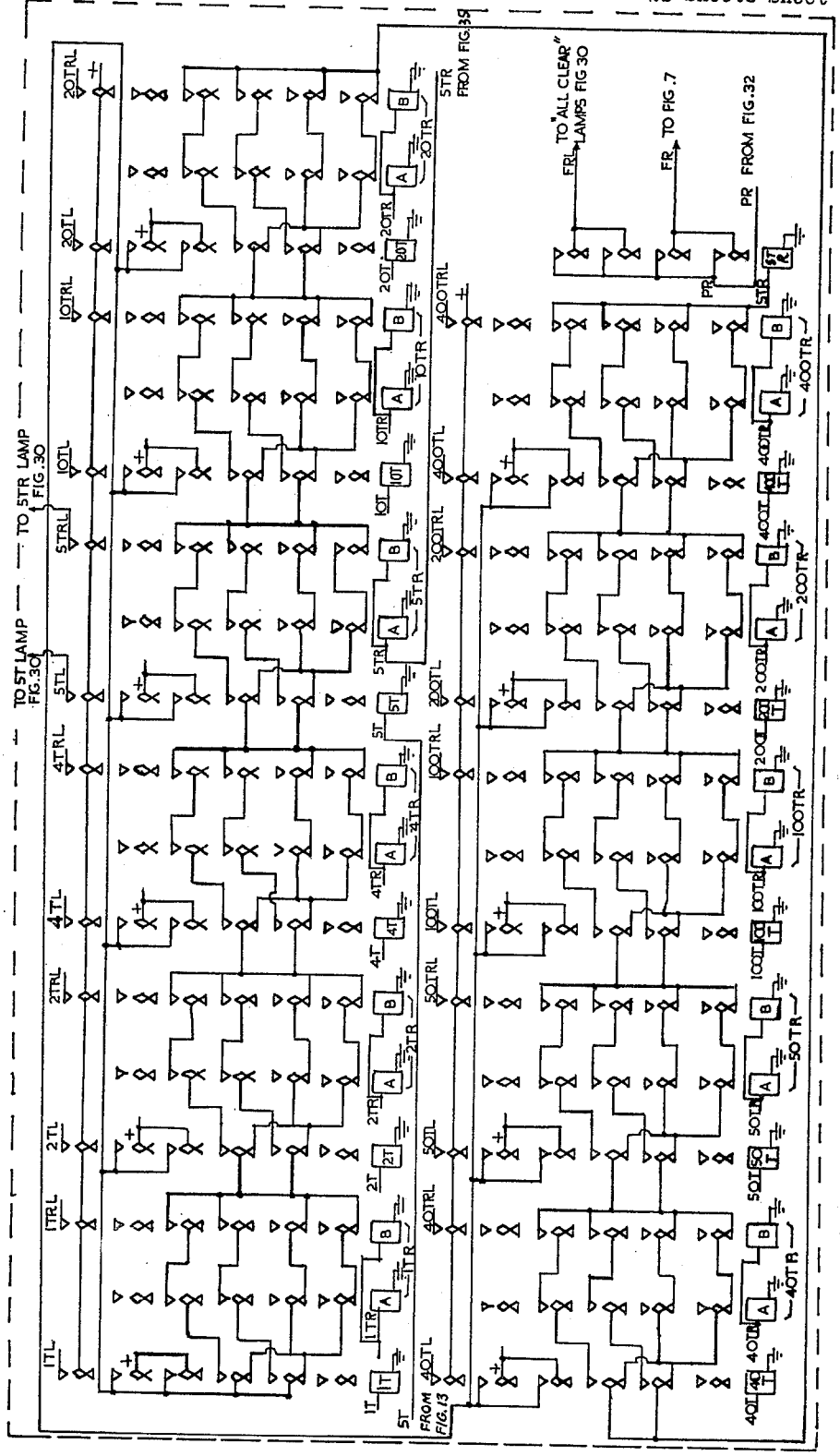
Figure 33:
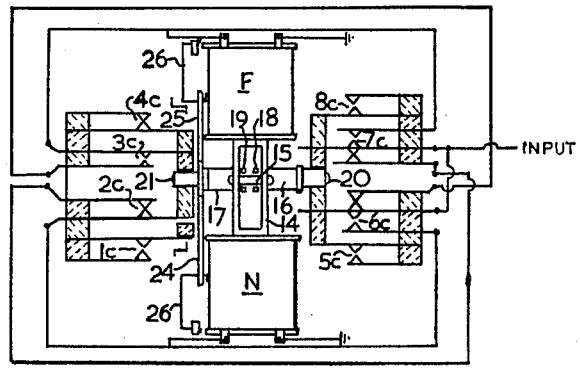
Figure 34:
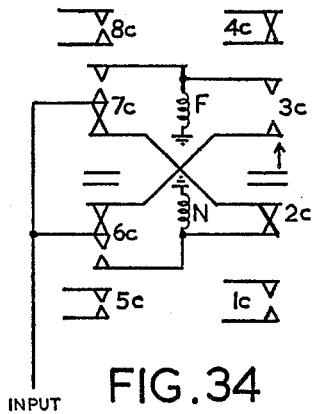
Figure 35A:
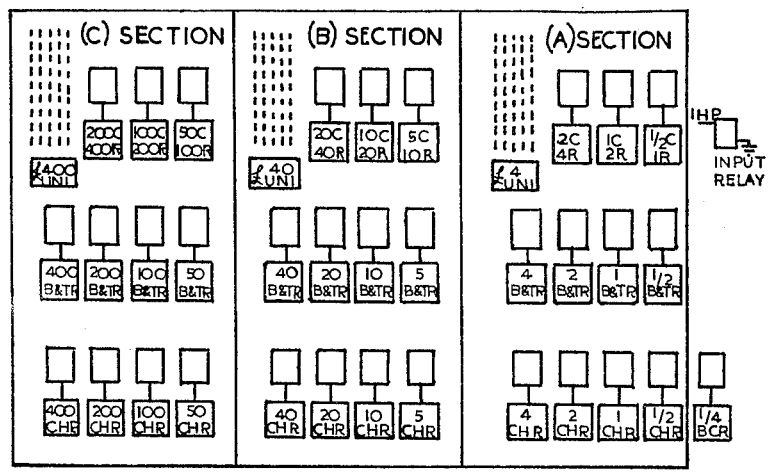
Figure 35:
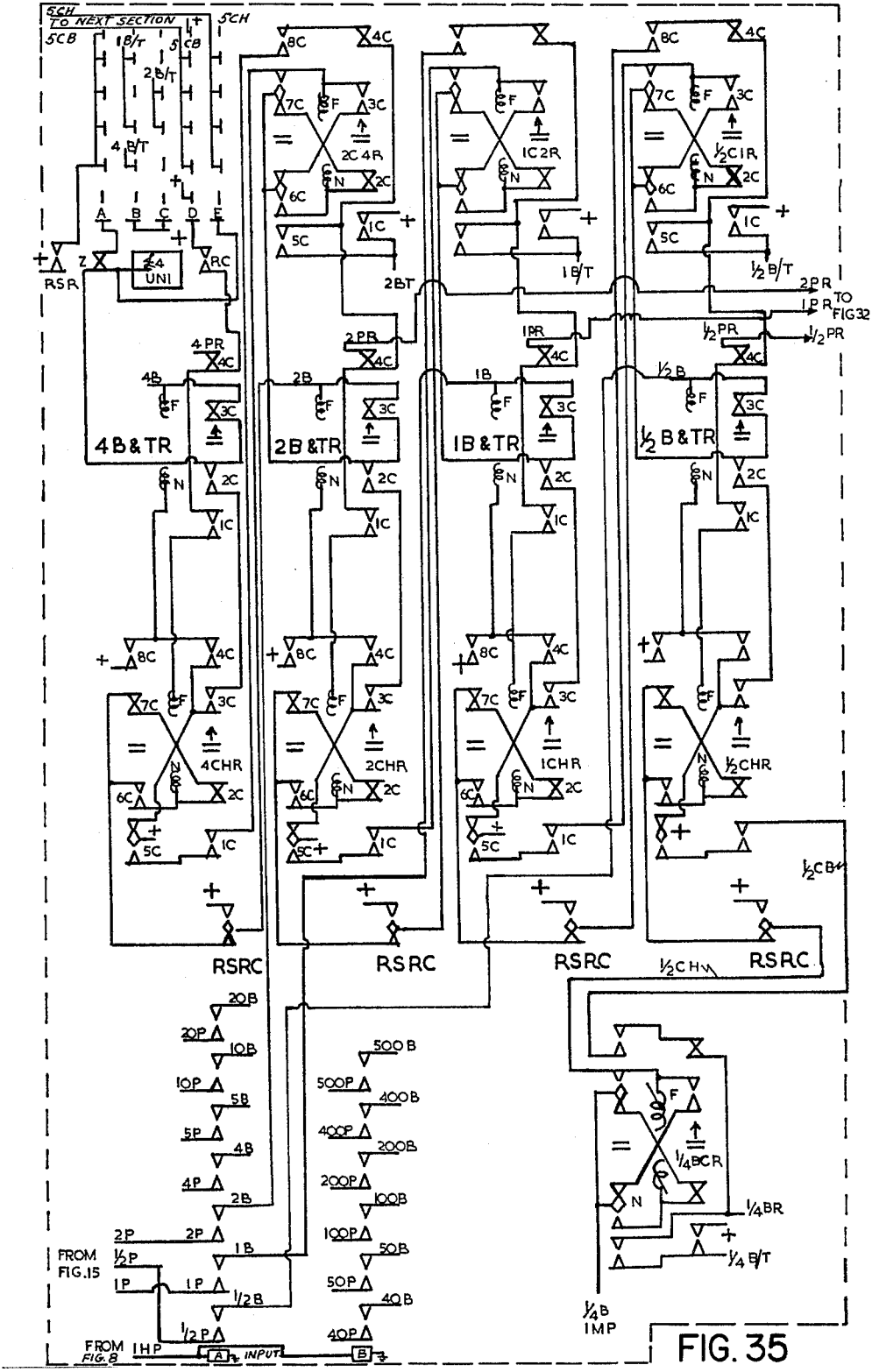
Figure 37:
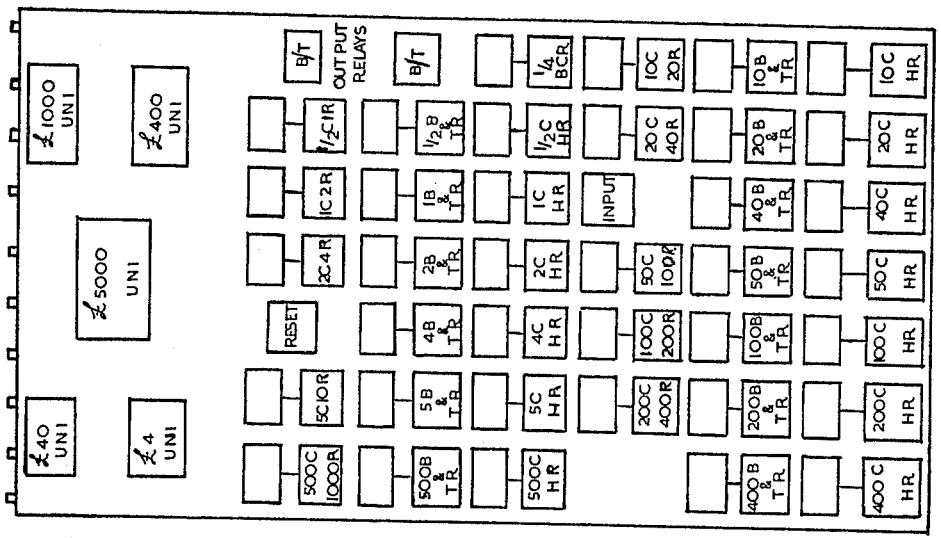
Figure 36:
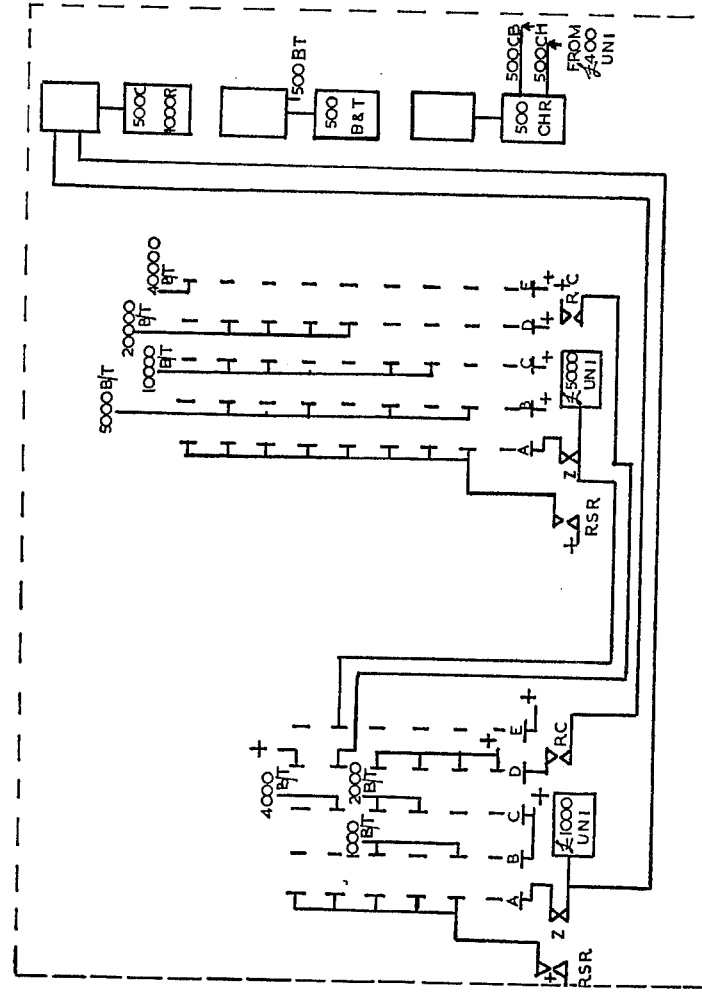

FIGS. 15 and 16 together when placed side by side represent the final section which is the Multiplying Relay Groups;

FIG. 17 is a representation in plan of an indicator lamp panel at each keyboard machine by which information relating to betting odds is signalled from the control unit;

FIG. 18 shows schematically two associated relay groups individual to each keyboard machine, which enable the respective machine to request from the control unit the betting odds available for each contestant;

FIG. 19 is a view, with a schematic showing of some contacts, of the face of an odds adjusting and profit indicating panel, of which one is provided per contestant and each is common to all keyboard machines;

FIG. 20 illustrates an encoding circuit comprising individual relays for all of the betting odds the apparatus is capable of offering;

FIG. 21 shows groups of relays principally associated with the lamp circuits of the indicator panel of FIG. 17;

FIG. 22 is a schematic diagram of a circuit for comparing the total "take" and "pay" individual to each contestant and deriving therefrom automatically a profit or loss result;

FIG. 23 includes a circuit for automatically adjusting the betting odds for a respective contestant in response to signals received from an associated subtracting device as shown in FIG. 22. It also includes part of the electrical arrangement for alarming keyboard machines to changes made in betting odds;

FIG. 24 shows a group of relays corresponding to betting odds to which the apparatus may be adjusted. This circuit is employed together with that of FIG. 23 to provide for automatic betting odds adjustment. Only a few of the odds relays used in practice have been shown for illustrative purposes;

FIG. 25 is a cycling arrangement which ensures that all keyboard machines receive and acknowledge the alarms given for betting odds changes;

FIG. 26 is a circuit of relays with contacts interlinked to provide for illumination of appropriate ones of the lamps "R/No" and "C/No" shown in FIG. 17 to outline desired numerals at the keyboard machines;

FIG. 27 is a circuit principally concerned with the registration of special wagers but also functions together with other circuitry to provide a safeguard against incorrect keying at the respective keyboard machine;

FIG. 28 shows the power deriving circuit for each keyboard motor 46 and associated clutches 43S and 53S, through which circuit a safeguard against incorrect keying of a wager is obtained;

FIG. 29 is an illustration of relay trains for controlling a safeguard circuit for key operation;

FIG. 30 shows a tell-tale lamp panel which, by illumination of appropriate lamps, may be read to indicate fault conditions in parts of the apparatus;

FIGS. 31 and 32 depict two trains of relays having their outputs associated in a common relay, which provide for fault localization on the apparatus;

FIG. 33 is a diagrammatic view of a known double-action relay which is used in the circuitry of the accumulators of the apparatus;

FIG. 34 is a schematic representation of the double-action relay of FIG. 33;

FIG. 35 shows a section of an accumulator according to the invention which utilizes the double-action relays shown in FIGS. 33 and 34;

FIG. 35A shows by block schematic a group of three such sections;

FIG. 36 is a final section of the accumulator shown partly in FIGS. 35 and 35A; and FIG. 37 shows diagrammatically the layout of components of the accumulator as assembled on a tray which is made slidable within a bay of the apparatus at the control unit.

In the electrical circuitry shown in the accompanying drawings the diagrammatic representation has been kept as clear as possible to assist the reader in obtaining a ready appraisal of its functioning. To this end the interconnecting lines between contacts or windings of different relays are in many cases dispensed with and represented instead by the use of like references designating individually the interconnected contact and/or relay windings. An interconnection may thus be recognised by matching the designation references of the drawings. However, in every instance where an example signal is traced through the circuit by the description, the actual effective connections are shown.

Furthermore, it is to be noted, that for ease of description the contact pairs of relays are referred to hereafter as though numbered consecutively from the winding, as shown in the figure. Thus the contact pair adjacent the winding, being the lowest, is often called the "first contacts."

The invention will now be described in greater detail by reference to a preferred embodiment in which the apparatus of the invention is applied and utilized for betting transactions occurring at a number of positions about a race course. In such a case there will be several races each possibly containing between twenty and thirty contestants in respect of which a large variety of betting odds may be advertised or displayed in accordance with their degree of favouritism, and wagers may be made at stakes which vary in value between very wide limits.

With reference to the block schematic representation of the apparatus as shown in FIG. 1 two outlying keyboard machines $k$ are illustrated which are connected by subterranean cables 1 to a control unit 2 at a central location on the race course. Each keyboard machine $k$ may be provided in a weatherproof cubicle in a convenient position in its respective betting area or it may be removable when not in use and thus provided with a plug-in connector to the cable 1. The control unit $z$ comprises one or more bays A on which the "Pay" Accumulators individual to each identification number of the contestants are mounted by means of sliding panels. A "Take" Accumulator common to all contestants' numbers is also mounted upon the bay A. Each "Pay" Accumulator preferably has its components mounted in an open sided metal frame so that access is readily available to both the front and the rear of the components. Each accumulator frame is laid upon one of its sides in guide channels provided in the accumulator bay. All of the connections to and from the circuits of each accumulator are brought to one, the inner, end of the accumulator frame and terminate in the socket terminals of a connector unit such as a jack switch. The leads to and from remote equipment to which the accumulator is normally connected are brought to the terminals of the cooperating portion of the connector. In this way, when an accumulator frame is in position in the bay A, a ready connection can be made thereto by coupling the two portions of the connector together. Furthermore this arrangement enables speedy replacement of a faulty accumulator by a spare one which may be held in reserve. The "Pay" accumulators for all contestants are mounted in this way in rows and columns upon the accumulator bay A at the control unit 2 or upon several bays if necessary.

In a convenient position upon a separate bay frame B is mounted various common equipment such as the multiplier equipment for deriving the individual "collect"

for each wager, which functions in common with all keyboards machines and in respect of all contestant numbers, and some if not all of the indicator panels which are provided individually for each available contestant number. If there is insufficient space on the bay frame B to accommodate all the indicator panels, the remainder may be mounted upon additional bay frames. Preferably each indicator panel has a face plate such as that shown in FIG. 19 beneath which is assembled a subtractor unit and an odds adjusting unit, all of which will be described in detail hereafter, all connections to and from which are terminated on the jack blades of a conventional type telephone jack switch. Connections to and from these components are included in the cable form in the bay frame and terminate on the socket blades of the jack switches so that the complete indicator panel unit may be lifted bodily to disengage its associated jack switches for removal and replacement, if necessary.

The construction of the indicator units and "Pay" Accumulators are standardised so that any one is interchangeable with any other, thereby simplifying the maintenance on the apparatus at the control unit 2 whereby faults may be cleared with a minimum of delay and interruption to the operation of the apparatus.

Functioning of keyboard keys

Each keyboard machine is provided with a set of keys, shown as circles in FIG. 2, arranged in columns and groups of columns whose basic purpose is to convert relevant statistics of the betting transactions into an electrical condition so that they may be conveyed through the electrical cable back to the control unit 2. For this reason the keys are arranged as shown in FIG. 2 in three groups which, reading from left to right of the figure, are labelled "Stake," "Odds" and "Contestant No.". The "Stake" keys are arranged in two columns which relay to control the stakes involved in each wager. The following three columns are the "Odds" keys and relay the odds laid in the wager made, while the final two columns of keys relay to control the identifying number of the contestant on which the wager is placed. The individual keys are labelled as shown in the drawing for the convenience of the operator, and for schematic identification, the key columns are referred to as columns CK1, CK2, OK1, OK2, OK3, SK1 and SK2 reading from right to left of the keyboard as viewed in FIG. 2. Individual contacts, to be referred to later in greater detail, are associated with the keys and are closed upon depression of the relevant key. It will be noted, however, that all of these keys with the exception of the contestant keys have a double pair of contacts. A motor start switch MS which has associated contacts MSW and MR is also located on the keyboard to the left of the key groups.

The mechanical construction of the key columns is shown in FIGS. 3 and 4 which show each key mounted upon a stem 2 which is slidable transversely across a frame 1. A return spring 2a surrounds the stem 2 and abuts one side of the frame 1 so as to urge the key into its normal, outer, position. The frame 1 is common to an individual column of keys beneath which a sliding strip 3 is held by studs 5a. The studs are preferably rivetted to the slide 3 so that they move therewith within a slot within the frame 1 but are held thereto by their enlarged heads. Square shaped slots 6 are also provided in the slide 3 through which the inner ends 7 of the key stems 2 pass. When a key is depressed it carries a lateral shoulder 4 through the respective slot 6 to displace the slide 3 to the right hand side of the drawing until the shoulder 4 has passed below the slide which will then return under the action of its return spring 3a thus passing over the shoulder 4 and locking the key in a depressed position. It will be seen, therefore, that displacement of the slide by the depressed key will allow any other key previously held depressed to restore under the action of its spring 2a so that only one key in that column can be locked depressed at any one time. It will become apparent from the description as it proceeds that regardless of the contestant No., odds and stake keyed on the board, the depression of a key in each column of keys will be necessary. Thus, by normal operation of the keyboard all the keys depressed in connection with the previous wager will be automatically released as the fresh wager is keyed.

The slide bar 3 of the CK1 key column abuts at one end a contact spring set having a single pair of contacts. Momentary deflection of the slide 3 as the shoulder 4 passes through the slot 6 sends a positive potential pulse to line O/ImpL as these contacts close momentarily. The function of this pulse will appear clear in the following description but effectively it can be said to control the signalling of an indication of odds from the control unit to the particular keyboard machine.

A frame member 18a provides a mount for the spring sets 8 for each of the keys in each column of keys. Each spring set 8 is mounted immediately beneath the inner end 7 of its respective key stem 2, so that upon depression of any key its inner end 7 operates the respective spring set 8 thereby closing its contacts. In the case of the contestant keys in columns CK1 and CK2 a single pair of contacts 9 are provided which when closed provide for the connection of potential thereacross. Two pairs of contacts are associated with the remaining keys shown in FIG. 2, i.e. the "Odds" and "Stakes" keys and hence the spring set 8 associated with those keys have contact pairs 9 and 10. The contacts 10 are arranged differently for different keys as can be seen from FIG. 2 the reason for which will appear clear from the ensuing description.

Printing of betting ticket

As an optional feature of this equipment a betting ticket may be automatically printed which can be handed to the client making the wager to provide him with a record of the transaction. This feature may be derived by providing a hingeable cam member 11 (see FIGS. 3 and 4) having cam-faces 11a adjacent to the inner end 7 of each respective key. Each cam-face terminates in a slot 12. The cam member 11 is free to swing on two pivoted links 31 and the slots 12 are so spaced with respect to each other that the distance between centres of adjacent slots 12 is $1/32$ of an inch less than the spacing between adjacent key stems 2. The key assembly for each column of keys is so arranged that the key closest to one end, when depressed, displaces the cam member 11, $1/32$ of an inch towards the right hand side of FIG. 3, while the next key in the column displaces the member 11, $1/16$ of an inch, and so on whereby the key at the other end of the column displaces the member 11, $5/16$ of an inch. A slot 32 is provided in one end of the member 11 which encloses a pin 33 secured to the end of a bell crank lever 34 pivoting on a spindle 34a (see FIG. 5). A type strip 35 is hinged to a pin 36 fixed to the outer end of the lever 34. The distance between centres of pins 36 and 33 with respect to spindle 34a is in the ratio of 4:1 so as to provide a four times magnification of the movement of pin 33 to the type strip 35. Hence a movement of $1/32$ of an inch of the pin 33 results in a displacement of $1/8$ of an inch of the strip 35 thus permitting the use of type of about $1/8$ of an inch in height. The type strip 35 is bent about an arc of a radius equal to the spacing of the pin 36 from the spindle 34a and is backed by a solid supporting block 35a, and is returned to its rest position by a spring 37 upon release of the respective actuating key which also returns the member 11 to its normal rest position. A similar type strip 35 is provided for each key column and all of these are located in side-by-side relationship and closely spaced by appropriate off-setting of the outer end of the respective bell crank lever 34.

A progressive serial number print counter 48b is located to the rear and in line with the printing position of the type strips 35, by which means an identifying serial number for each betting transaction may be printed upon the betting ticket. A type ribbon not shown is normally spaced in front of the said printing line with a strip of carbon backed paper 58 which passes to the rear of the type ribbon from a free running roller 39 on to a take-up roller 60 having a ratchet 61. A supporting position for a betting ticket is provided to the rear of the carbon backed paper by a pair of confronting slotted frames 65.

The machinery for printing desired information upon the betting ticket and the recording carbon backed paper is constructed as follows. A pair of solenoids 43s–53s are associated with suitable respective clutches 42–52 which when operated by their solenoids connect lay shafts 44c and 54c to their respective main shafts 44a–54a to ensure only a single rotation thereof. The main shafts 44a and 54a are driven from a geared-down motor 46 through bevel gears 44, 45 and 54, 55. The motor 46 operates under control of switch SW on the keyboard (FIG. 2) and ceases to run after a revolution of shaft 44c by control of wiper switch 56B to be described later. Shaft 44a rotates a lever gear 40 through a bevel gear 41, and the clutch driven shaft 44c, while shaft 54a simultaneously rotates a lever gear 50 through a bevel gear 51 and the clutch driven shaft 54c. Rotation of the gear 40 about a fixed spindle 39a turns with it a pair of lateral cams 39 and 39b. The movement of cam 39 causes a striker arm 38 which carries a platen face 38b to print the type figures set up on the type strips 35 on to the carbon backed paper strip 58 and the betting ticket (not shown). The cam 39b which is spaced 180° from the cam 39, is arranged to operate the ratchet 61 of the roller 60 through a lever 63 having a link 62 and a spring 64 holding the lever 63 in engagement with cam 39b. Simultaneously with the movement of the shaft 54c the lever gear 50 which carries a lateral cam 49 causes operation of a second striker arm 48 carrying a platen face 48a to print the serial number set up on the numbering counter 48b on to the recording paper 58 and the ticket. Appropriate betting information associated with the wager is thus recorded on the carbon backed paper 58, and the printed betting ticket may now be handed to the customer for his record of the transaction.

Upon the shaft 44c which rotates one revolution upon actuation of the clutch 42, is fixed an insulated disc 56 carrying a copper plate 57 at one part of its periphery. For each rotation of the disc 56, therefore, the plate 57 closes the circuit between two wipers to place potential on an ASK line momentarily, for a reason to be referred to later. Similar discs 56a and 56b are also provided on the lay shaft 44c, the functions of which collectively take charge of the continued operation and shut down of the motor 46 after initial starting is provided from the manual switch MS on the keyboard. This arrangement ensures a reliable full revolution of the shafts 44c and 54c with each depression of switch MS.

In order to achieve operation of the clutches 42 and 52 their respective solenoids 43s and 53s may be operated directly by depression of the manual motor start switch MS. In such a case potential will normally be applied to the line MR and the other side of the contact of the switch MS may be connected to the two solenoids 43s and 53s. As an optional piece of equipment a circuit may be incorporated to prevent effective operation of the motor start switch should the odds and/or stake keys be manipulated in such a way to register a wager which the betting apparatus is not prepared to accept. Furthermore printing of a betting ticket for the customer is not essential as it is possible for a record of the transaction to be made manually, if desired. In such a case the motor switch MS will principally serve to initiate the signalling path between the keyboard machine and the control unit.

*Relay of betting information from keyboard machines*

Statistics of each wager made in the betting transactions at all of the keyboard machines are relayed to the control unit by appropriate operation of the keyboard keys by the operators. Signalling in this way is facilitated by electrical potentials passing between each keyboard machine and the control unit. As a result of the statistics so conveyed the wagers transacted at all betting positions are recorded at a central location whereby a single bookmaker may readily appraise the state of his "book" and exercise control in respect of future wagers to be accepted. Signalling from each keyboard machine originates from closure of the contact spring sets 8 of the operated keys.

The principal function of the control equipment is to receive from any one keyboard machine at any instant the statistics of a wager signalled therefrom and to register progressively the total "take" on the contest and also the total "pay" corresponding to each individual contestant. A single "take" accumulator is provided for the former purpose with a number of "pay" accumulators individual to each contestant number provided for maintaining the latter totals. A common multiplier unit is also employed which receives through the keyboard signals the value of odds and stakes involved in the wager and converts these statistics into a corresponding "collect" value for the wager which is automatically submitted to the "pay" accumulator respective to the contestant number on which the wager has been made. Although it is not essential that the keys of the keyboard be operated in any particular sequence it will generally be found convenient that each wager be keyed by first depressing the relevant contestant number keys, followed by the keys corresponding to the betting odds at which the wager is to be made and concluding with the keys relevant to the stakes value of the wager.

Reference will now be made to FIGS. 7 and 8 through the operation of which circuits, the keying of a wager upon the keyboard, shown in FIG. 2, may be shown to initiate a signal to the control unit by which the relevant statistics may be relayed. The bets relays shown in FIG. 7 could, of course, consists of a single winding controlling a large number of contacts, but for efficiency in operation it is preferred that these contacts be divided over a number of shunt connected windings of which seven, referenced A to G, are shown in the drawing. The contact pairs associated with the five windings A to E of the bets relays are connected from one side to lines associated with all of the odds keys and stakes keys on the keyboard of a respective one of the machines, while the other side of these contact pairs is multiplied with similarly identified contacts of the bets relays associated with the remaining keyboard machines and connected permanently to the multiplier equipment (particularly FIGS. 11 and 13) at the control unit. The contacts of the bets relays are normally open and these relays become operated to connect the key contacts of any keyboard machine to the control when a wager has been keyed and the control unit has automatically provided a signalling path for that machine.

The signalling path referred to is provided in the following manner. It shall be assumed that a wager on No. 1 contestant involving a stake of £100 at betting odds of 2 to 1 has been made and keyed on the keyboard of a particular keyboard machine. The contestant keys labelled "No" and "1" in columns CK1 and CK2, respectively, will now be depressed and potential applied to lines HN and H1 through the key contacts 9. Line HN is in turn connected to one side of the normally open sixth contact of the G winding of the bets relays while line H1 is connected to the normally open lowermost contact of the F winding. In the same way potential is applied to line NoR, O2 and O/1 of the odds keys labelled "No", "2" and "—/1" respectively. These marked lines are connected to the second normally open contact of winding D, the lowest contact of winding E and the third contact of winding C, respectively of the bets relays. In a similar manner the now marked contacts S1 and £00 of the key labelled "1" and "£00" of the columns "SK1" and "SK2", respectively, of the stakes group of keys are also connected to the second contacts of winding B and fifth contacts of winding A, respectively of the bets relays. The marked condition of these lines will thus persist for as long as their respective keys remain in a depressed condition.

The relevant statistics of the wager have now been keyed and hence manual operation of the motor switch MS may serve to operate the solenoids 43S and 53S of the clutches 42 and 52 (FIG. 5), as well as to operate the motor 46, thereby providing for printing of a betting ticket in the manner described previously. As soon as the motor 46 receives its starting pulse, which will persist only while the switch MS is pressed, disc 57B will rotate with the shaft 44C and the wipers associated with this disc will then be bridged by an electrically conductive surface on this disc, until a full revolution is completed and the wipers come to rest again upon the insulated piece 56b. Thus potential continues to be applied to the motor through these wipers to ensure a complete revolution of the shaft 44C. During this rotation the disc 56 carries an electrically conductive segment 57 beneath the wipers associated with this disc. As a result these wipers are bridged momentarily during each revolution and in this condition send a positive pulse to the ASK relay of FIG. 7.

When this relay becomes energised it locks on via its upper contact and places potential on line (A) and connects line (B) to the windings of the bets relays. The lines (A) and (B) are in turn connected to respective banks of an automatically hunting type stepping switch C55 (see FIG. 9) located at the control unit. The (A) and (B) lines of other keyboard machines are connected to other contacts on the contact banks of the stepping switch C55. Hence, it should be appreciated that in the present condition of the apparatus one keyboard machine, of possibly many of such machines disposed about the race course and remote from the control unit, has had a wager keyed on its keyboard and same has been offered to the control unit through the medium of an (A) contact carrying a marking potential. In the present instance it is assumed that the machine is identified as M1 and thus contact M1. (A) at the siwtch C55 is marked. If a number of keyboard machines are simultaneously offering a wager to the control unit for registration, each in turn will be selected by the stepping switch and upon completion of registration of that wager the marking potential on that machine's (A) contact is removed and the switch automatically hunts for the next marked (A) contact in its progression sequence, until all wagers offered to the control unit have been registered thereat.

As the wipers of the switch C55 automatically wipe over the contacts of its two banks they finally make contact with the marked contact (A) of the present machine, now refered to as contact M.I.(A). The stepping of the switch C55 will now be arrested by the potential at this contact which is applied directly to its coil. The second wiper B of the switch C55 which normally carries potential moves in step with the wiper A and thus is now in contact with contact M.I.(B) and applies its potential to the line (B) associated with the ASK relay (FIG. 7). This results in the operation of all of the windings of the best relays so that the marking conditions on the lines associated with the depressed keys is now connected to the multiplier equipment at the control unit in a manner to be described.

Through the operation of the F and G windings of the bets relays the lines H1 and HN from the contestant number keys are connected to lines H1L and HNL, respectively. The potential on line HNL operates relay HNR which then pulls in its ten contact pairs and through the first of these contacts connects the marking potential of the line H1L to line 1HP. This line 1HP in turn is connected to the operate winding of the input relay of the contestant "pay" accumulator individual to the number of the contestant which has been keyed on the keyboard, in this case contestant No. 1. Due to this operation, the output from the multiplier equipment which is connected in multiple to all of the "pay" accumulators is received only by the "Pay" accumulator associated with the contestant No. 1.

*Mutliplier equipment*

The control unit multiplier equipment if formed of distinct sections some of which do not, in fact, take part in the multiplication from which is derived the "collect" value for each wager. With reference to FIGS. 10 to 16 of the drawings, particularly FIG. 11, it will be seen that signals from the signalling keyboard corresponding to the betting odds statistics of the wager, are received in an Odds Decoder Relays Group, part of the output of which is connected to a further section known as the Base Relays Group. A Multiplying Relays Group receives signals indirectly from the output of the Base Relays Group through a section known as the Conversion Relays Group and a final section is included which is referred to as the Take Decoder Relays Group into which signals corresponding to the stake statistics of the wager are inserted.

An explanation will now be given of the method of multiplication utilized by the equipment shown in FIGS. 10 to 16, which obtains the total value of the stake and the "pay" in respect of each wager in the semi binary, semi decimal progression of ½, 1, 2, 4, 5, 10, 20, 40, 50, 100, 200, 400 and 500. Values below a ½ may be ignored as insignificant in relation to odds which are assessed on values to the nearest £100, but it will be appreciated that smaller values may be included and are, in fact, shown in the multiplication circuits of the drawings.

In the multiplication method used all results are shown in pounds or fractions of pounds. The method of multiplying odds values by money values will now be described.

Assuming that £40 is invested on a contestant at the prevailing odds of, say 13 to 2. By simple multiplication of fractions the result may be obtained as follows:

$$\frac{15}{2} \times \frac{40}{1} = 300$$

or by substitution: where $B=1$, and $M=1$ $$15B\left[\left(\frac{1}{2} \times 4M\right)(£10)\right]$$
$$15B[(2M)(£10)]$$
$$15B(20), \text{ or } 15 \times 20 = 300$$

The B value will be referred to as the base odds value and is arrived at by adding together the odds components for example 13 to 2 give an odds value of $13+2$ or B15, and 6 to 1 of $6+1$ or B7. The method of obtaining these base odds values is shown by the Odds Decoder relays in FIG. 11. The coils of these relays are connected by lines common to all keyboard machines, but, as previously explained marking conditions on these lines can only be transmitted through their respective bets relays by one machine at a time.

Figure 13:
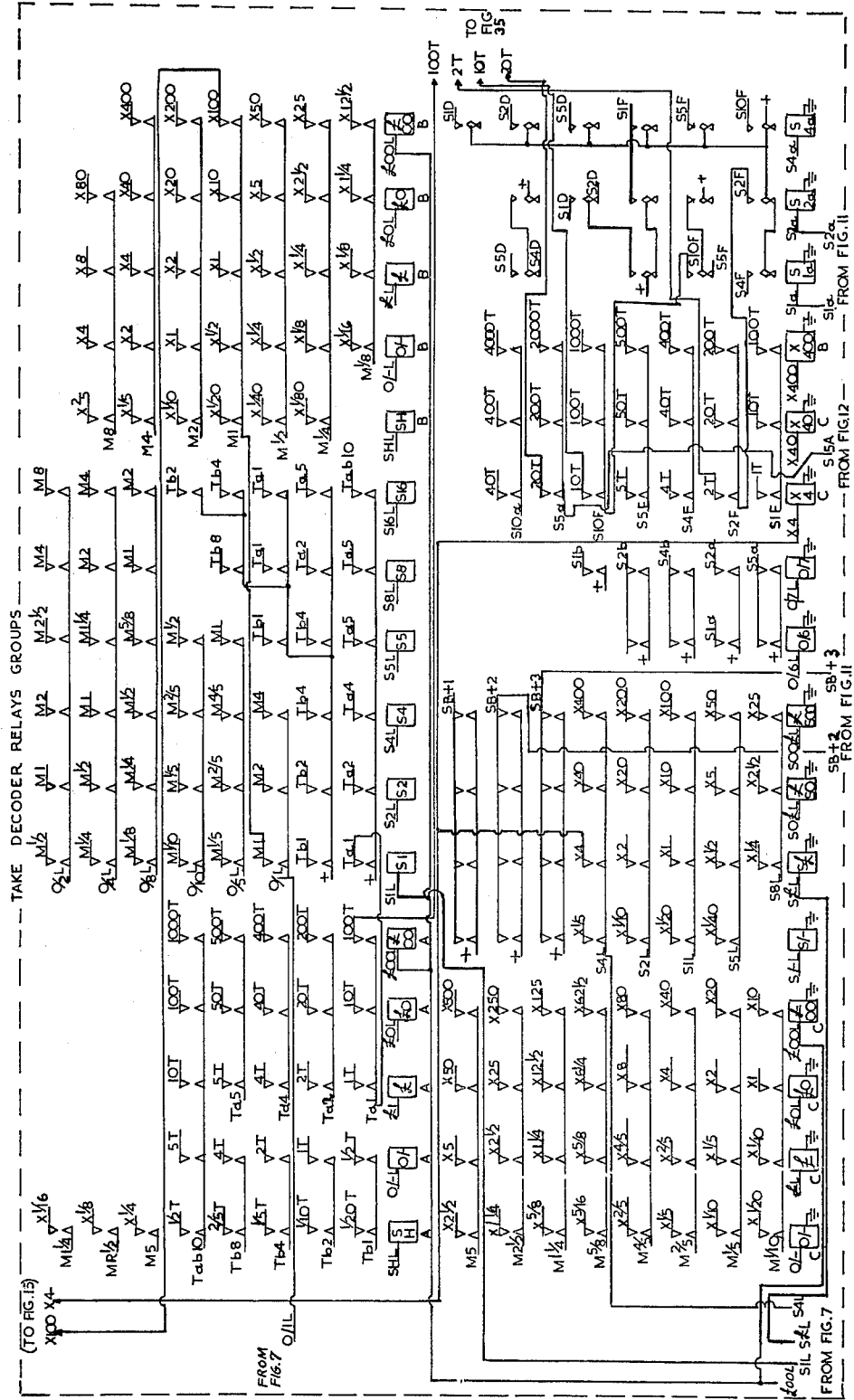
FIG. 13 is a diagram of a third section of this equipment known as the Take Decoder Relay Groups.

The M value will be referred to as the intermediate multiplier value and is arrived at by a group of relays S1, S2, S4, S8 and S16 shown in FIG. 13 the coils of which are energised through the contacts of the bets relays of a respective keyboard machine in a similar manner to that for the relays in FIG. 11.

Figure 12:
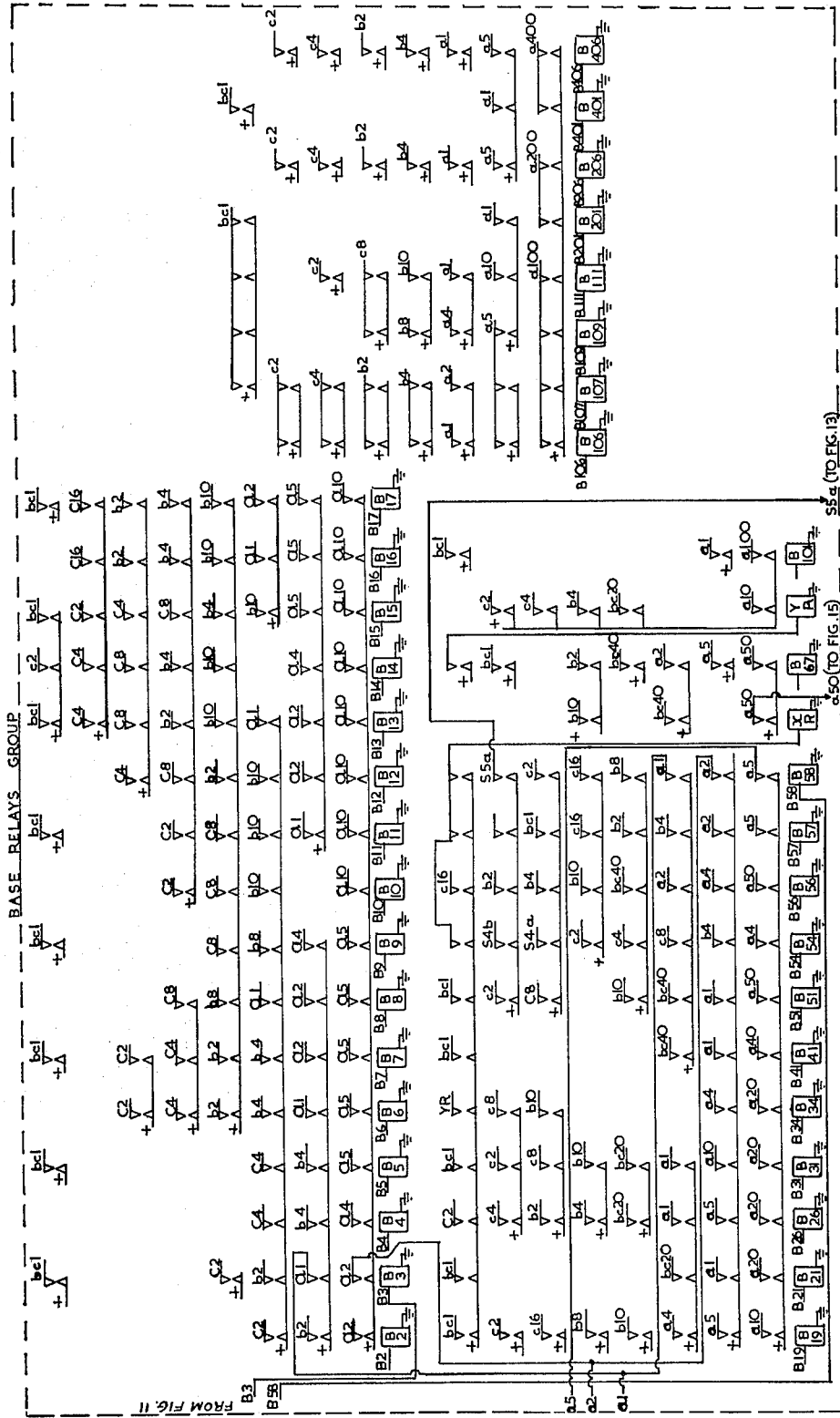
FIG. 12 shows a second section known as the Base Relay Group.

The M values so obtained are then connected by line to the contacts of a group of relays SH, O/—, £, £0, £00 in FIG. 13 to obtain the X values which will be referred to to as the final multipliers. These relays are shown as having two or more windings, A, B, etc., to avoid the overloading of a single winding by too many contacts. Now in order to facilitate the multiplication of the base values B, by the final multipliers X, the base values B are arranged into a plurality of mathematical progression groups of relays shown in FIGS. 12 and 14. FIG. 12 shows a group of B relays, the coils of which are connected by line to the base value contacts of the relays as shown in FIG. 11. Only one of these base value relays shown in FIG. 12 can be operated by any one wager and when operated supplies potential to one or more of three separate groups of conductors representing three separate mathematical progressions and in each case the total value being equal to the base value of the relay being operated. These three groups are distinguished by the symbols $a$, $b$ and $c$. However, 1, 20 and 40 are common to both symbols $b$ and $c$ and are therefore shown as $bc1$, $bc20$ and $bc40$, and 100, 200 and 400 are shown as $a100$, $a200$ and $a400$ and common to all three groups.

The mathematical progression of the $a$ group is 1, 2, 4, 5, 10, 20, 40, 50, 100, 200 and 400, of the $b$ group is 1, 2, 4, 8, 10, 20, 40 (80 not used is omitted) 100, 200 and 400 and of the $c$ group 1, 2, 4, 8, 16, 20, 40 (100 is later converted to $80x$ and $20c$ by a relay $a100$ in FIG. 14) 200 and 400 being common to all three groups. The "pay" accumulators collect values only in the binary decimal progression of 1, 2, 4, 5, 10, 20, 40, 50, 100, 200, 400 and 500, and consequently it will be understood that the final pay values resultant of all multiplication must be in that order.

It will be seen that the $a$ group of values direct from the contacts of the base value B relays in FIG. 12 are in that order and when connected direct to one side of the normally open contact of $a$ group of X relays $X\frac{1}{10}$, X1, X10 and X100 as shown in FIG. 15, give a corresponding pay value according to any one of these said X relays which may be operated and as shown by the out-going P lines $\frac{1}{10}$P, 1P etc. to 500P. The P lines are connected to operate the pay accumulators as will be described in detail later.

The $a$ group of conductors are also connected to operate a central group of conversion relays shown in FIG. 14, the purpose of which is to multiply the values received by two and by four but so that the values so arrived at are in the same mathematical progression as the $a$ group. The times two groups are represented by the symbol D and when applied to the contacts of $a$ group of relay $x\frac{1}{5}$, $x2$ etc. in FIG. 15 produce the same result as that performed by the $x\frac{1}{10}$, $x1$ etc. group. In like manner the times four group performs the same function in conjunction with the group of relays $x\frac{2}{5}$, $x4$ etc. The same procedure is followed to obtain times eight by the left hand and right hand groups of relays shown in FIG. 14 which function in conjunction.

The $b$ group of values obtained from the base relays in FIG. 12 when each digit is divided by two is conformed to the same mathematical progression as required for the "pay" values, viz. the same mathematical progression as the $a$ group but when this is done the resultant value is exactly half of the actual base value so that when the $b$ values are applied to the contacts of $a$ group of relays $x\frac{1}{20}$, $x\frac{1}{2}$, $x5$, $x50$ and $x500$ in FIG. 16 the correct outgoing "pay" values are obtained.

A similar application applies regarding the $c$ value group when applied to the $x\frac{1}{4}$, $x2\frac{1}{2}$, $x25$ group of relays in FIG. 16. A group of relays at the right of FIG. 14 converts the $b$ and $c$ values into suitable values applicable to the $x1\frac{1}{4}$, $x12\frac{1}{2}$, $x125$ group of relays and to the $x\frac{5}{8}$, $x6\frac{1}{4}$ and $x62\frac{1}{2}$ group of relays in FIG. 16 so that the result is "pay" values to the correct multiplication of the original base values when multiplied by these multipliers and in the equivalent "pay" mathematical progression.

The "take" values are similarly converted into an $a$ and $b$ group of values by the relays S1, S2, S4, S5, S8 and S16 in FIG. 13: the $a$ values are shown by the symbols $Ta1$, $Ta2$, $Ta4$, $Ta5$ and $Ta10$. The $b$ values by $Tb1$, $Tb2$, $Tb4$, $Tb8$ and $Tb10$. These $Ta$ and $Tb$ values are appropriately multiplied via the contacts of the first five relays in FIG. 13 SH, O/—, £0 and £00 to produce the actual "Take" represented by each bet in the mathematic progression and applied to lines 1T, 2T, 4T, 5T etc. for transmission to the total "Take" accumulator to be later described.

In the case of the odds (to 6), (to 7), (to 9), (to 11) and the special odds 50/6, 50/7 etc. the "Take" values are obtained by an $a$ and $a$ $b$ group of values shown in the $a$ group by symbols $Sa1$, $Sa2$, $Sa4$, $Sa5$ and $Sa10$ and the $b$ groups by symbols $Sb1$, $Sb2$, $Sb4$, $Sb8$ and $Sb10$ from the contacts of relay O/6 and O/7 in FIG. 13 and the relays O/8, O/9 and O/11 in FIG. 11.

These $Sa$ and $Sb$ groups of values are multiplied when applicable by the $x$ multiplier relays employed to multiply the "pay" values.

For a better understanding of the equipment the reception at the multiplier unit of the example wager, viz., £100 at 2 to 1 on No. 1 contestant, previously referred to will now be considered. It has already been made clear that the function of the signal associated with the contestant number has prepared the pay accumulator respective to that contestant for reception of signals passing from the multiplier unit. It will therefore be assumed that a connection between the output of the multiplier equipment and the pay accumulator of the contestant number now exists. As explained previously this connection has been made possible by virtue of a signalling path to the control unit provided for the signalling keyboard machine. Completion of the signalling path results from the operation of the bets relays of the keyboard machine so that the marking potential on particular lines as determined by the operation of the keyboard are now relayed to the multiplier equipment.

The three odds keys now depressed in accordance with the example betting odds of 2 to 1 result in marking potential being applied to lines NoRL, O2L and O/1L which are connected to the Odds Decoder circuit (see FIG. 11). Simultaneously the marked lines S1L and £00L conforming with the wager stake of £100 relay their potentials to the input to the Take Decoder unit (FIG. 13) of the multiplier equipment.

Potential on line NoR operates relay NoR of the Odds Decoder circuit (FIG. 11) and through its second contacts relays the marking potential on line O2L through a line 2 to the normally open side of the second contacts of the A winding of relay O/1. The windings of this relay are now energised through the potential applied through line O/1L so that the potential on line 2 is connected to a further line B3 which passes from the Odds Decoder circuit to the input of the Base Relay Group (FIG. 12).

In this latter section of the multiplier unit relay B3 operates as a result of the potential on line B3 and potential is thus applied across its now closed contacts to lines $a2$, $a1$, $b2$, $c2$ and $bc1$. As a result these functions the odds of 2 to 1 have now been converted to base values of $a2+a1$, the $b$ and $c$ values being ignored in the case of the present example since they terminate on normally open contacts of relays which do not operate with signalling of the stakes value associated with the example wager. The $a1$ and $a2$ values represented by marked lines $a1$ and $a2$ are multiplied to contacts of numerous relays associated with different values of stakes.

Reference will now be made to the input of the Take

Decoder Unit (FIG. 13) where the single winding of relay S1 is operated via the marked S1L line from the bets relays (see FIG. 7) and the windings A, B and C of the £00 relay are also operated through potential from the £00L line. Firstly the multiplication of the values represented by these relays is effected as will be seen through the operation of their lowermost contacts. The first contacts of relay S1 place marking potential on line T$a$1 which through the now closed lowest contact of the A winding of the £00 relay passes this potential to the 100T line. This is a £100 "take" line which is connected to the input of the common "take" accumulator where it becomes registered and included in the total "take" for all participants in the contest.

The O/1L marked line relaying the betting odds statistics of "—/1" is also connected to one normally open side of the third contacts of the S1 relay, which now being operated transfers this potential to line M1 which being in turn connected to one side of the fourth contacts of the B winding of relay £00 places its potential on line X100. This latter line passes from the Take Decoder circuit to the A winding of the X100 relay of the Multiplying Relays Group (FIG. 15) which pulls this winding up. As previously described the output of the Base Relays Group (FIG. 12) contains marked lines $a$1 and $a$2 which enter the Multiplying Relays Group and across the now closed two lowermost contacts of the A winding of the relay X100 to relay their marking potential to "pay" lines 100P and 200P which lead from the multiplying circuit to the input of the "pay" accumulator of the contestant number which has been prepared for reception of these signals. The total value corresponding to the marked lines is registered by the accumulator and added to the total "pay" for the particular contestant which exists as a result of the previous betting transactions on the contest. It will now be seen that the statistics of the wager made at the keyboard machine has been registered at the control unit, which is now capable of registering further wagers from this or any other keyboard machine. Any suitable means may be employed for discontinuing the signalling path between the particular keyboard machine and the control unit in order to allow the auomatically hunting stepping switch C55 (FIG. 9) to hunt further for another keyboard machine offering a wager for registration. As shown in FIG. 7 a relay FR is employed to disconnect the locking potential on the relay ASK, which when operated will allow this latter relay to become deenergised and thus restore the bets relays and other circuits of the keyboard machine to their normal conditions. Functioning of the FR relay will be described in greater detail later in this specification.

A slightly different function of the multiplier equipment is involved where the wager placed at the keyboard machine involves one of the special betting odds (i.e. special wagers). Therefore, in order that a complete understanding is obtained of the equipment a second hypothetical wager will be considered, viz. betting odds of 50 to 8 in pounds and taken four times. The marking signals received at the multiplier equipment as a result of appropriate operation of the keys of the keyboard machine, is represented by marked lines O5L, ORL and O/8L of the odds statistics and S£ and S4 corresponding to the stake statistics. Before proceeding it should be explained that the first of these lines, O5L, is marked through the operation of a relay O/50 (see FIG. 27) operated by depression of key "50" of column OK1 which will be described in greater detail in connection with a later feature of the apparatus.

The odds lines cause operation of relays OR and O/8 and through the now closed contacts of the OR relay potential is applied from the line O5L to line 50 and via the uppermost, now closed, contact of relay O/8 to line B58 which is connected to and operates the B58 relay of the Base Relays Group (FIG. 12.). Since the $a$ values are the effective values in respect of the stakes to be considered it will be seen that potential is applied to lines $a$5, $a$2 and $a$1 of the three lowermost contacts of relay B58 while the line $a$50 associated with the lowermost contacts of relay XR is also marked due to the operation of this relay through the uppermost contacts of the B58 relay. Thus the value of 58 is represented by the now marked lines $a$50, $a$5, $a$2 and $a$1.

Simultaneously with receipt of the signals associated with the betting odds, signals corresponding to the value of the stake in the wager are received at the Take Decoder Relays Group (FIG. 13) to operate relay S£ via the line S£L. The marked line S4L is connected to one side of the fifth contacts of the relay S£. So with closure of this relay potential is applied to line X4 to operate the A, B and C windings of relay X4 shown in two different sections of the multiplier equipment. The winding C of the X4 relay is shown in the Take Decoder (FIG. 13) and its output is connected to the input of the common "take" accumulator. By virtue of the contacts 5 to 7 of relay O/8 of the Odds Decoder (FIG. 11) lines S1$a$ and S2$a$ receive marking potential through lines SB+2 and SB+3 which are themselves marked via the contacts 6 and 7 of relay S£ of the Take Decoder (FIG. 13). The line S5$a$, on the other hand, obtains its potential across the now closed seventh contacts of relay B58 (FIG. 12).

The lines S1$a$ and S2$a$ are connected to the operate windings of relays S1$a$ and S2$a$ (FIG. 13) which when energised places potential on lines S10$f$ and S2$f$ which together with marked line S5$a$ are terminated on one side of the normally open fifth, second and sixth contacts of the C winding of the X4 relay. Therefore, with closure of this relay, as above described, the lines 20T, 10T and 2T are now marked and transmit this potential to the input of the contact accumulator to represent a "take," or stake, for the wager of £32.

Meanwhile the marked lines $a$50, $a$5 and $a$1 (FIG. 12) operate relays A1, A2 and A5 (FIG. 14) of the Conversion Relays Unit so as to connect potential to lines 10$f$, 2$f$ and 20$f$, respectively. These three latter lines terminate on one side of the second, fifth and sixth contacts of the A winding of the X4 relay (FIG. 15), which now being closed relays the marking potential to the pay lines 20$p$, 10$p$ and 2$p$ representing a "pay" of £32 now registered in the respective pay accumulator for the contestant number. Simultaneously the $a$50 line relays its potential through the second contacts, now closed, of the B winding of the X4 relay to the pay line 200$p$. These marked pay lines thus represent a total pay of £232. The relevant statistics of the assumed wager of £50 to £8 taken four times has now been registered in the accumulators and breaking of the signalling path from that particular keyboard machine may be effected.

*Requesting odds and signalling of same*

As a desirable adjunct to the apparatus a feature may be incorporated which enables each operator of each keyboard machine to request and automatically obtain, through the operation of the keys of his keyboard, the odds to be offered to customers in respect of each contestant. It will be appreciated, of course, that this information may be obtained through the agency of a separate telephone circuit, but for speed of operation and convenience the signalling system to be described is preferred.

According to this embodiment of the invention the odds association with each contestant are indicated by illumination of appropriate lamps upon an indicator panel situated beneath the operator's keyboard (see FIG. 17). Lamps on the indicator are illuminated in response to signals received from the control unit which signals are sent in response to operation of the contestant keys at the keyboard machine. Thus each time a contestant number is keyed the odds available for the respective contestant are visually indicated on the indicator panel. A convenient procedure, therefore, for operators, prior to commencement of betting transactions in respect of any contest, is to key in turn the number of each contestant in the projected contest and record and display for the benefit of customers the odds so obtained. This may be facilitated by the use of a bookmaker's conventional betting odds indicator and/or other suitable means.

The indicator panel on the keyboard machine, shown in FIG. 17 has three central columns of lamps carrying labels as shown, by which the odds referred to above may be visually indicated to the operator by illumination of appropriate lamps. For example, if the odds on offer for a particular contestant are 2 to 1, the lamp labelled "to 1" in the left hand column, the lamp labelled "2" in the middle column and that labelled "No" in the right hand column will be illuminated. Along the bottom of the panel are displayed ten pairs of lamps which are labelled corresponding to "special" wagers to be described in greater detail hereafter. These pairs of lamps will be illuminated whenever their associated conventional odds are indicated in the central columns of lamps. For instance, upon indication of conventional odds of 6 to 1 the pair of lamps labelled "50/8" will also be illuminated, thereby indicating that the customer may be offered a special wager of £50 for an £8 stake, if desired.

To the upper left and upper right of the indicator panel, lamp signs labelled "R/No" and "G/No" and of a known type are provided. They are arranged so as to be capable of forming the outline of numerals by illumination of appropriate lamps. In each case any number between 1 and 29 is capable of being outlined. These signs are adapted to indicate to the operator the number of a contestant on which either a reduction or increase in odds has occurred. Their function in the apparatus will be described in greater detail hereafter with reference to a further optional feature of the apparatus.

A single pair of contacts $3b$ is associated with the sliding bar 3 of the column of contestant keys CK1, whereby depression of any one of the three keys in this column in causing movement of the slide bar 3 closes the said contacts $3b$. When closed potential is applied to line O/ImpL which operates relay O/Imp (FIG. 18) thereby closing all contact pairs of this relay and connection of line O/B to the operate windings of relays O/B$^1$ and O/B$^2$. The lines O/A and O/B from relay O/Imp are passed to an automatically hunting stepping switch at the control unit which is similar in function to the switch C55 of FIG. 9, previously described. Thus when the switch steps onto the marked O/A line of this particular keyboard machine marking potential is applied to line O/B. With closure of the relay O/B$^1$ line HN passes potential to line OHN and similarly potential is received on line OH1 from line H1. As a result relay OHN pulls in and line OH1 is connected to No. 1 C/O Sw+ (see FIG. 19), i.e. the C/O Sw+ line of the odds and profit panel individual to No. 1 contestant. It will be seen in FIG. 18 that the connection of the marking potential to the C/O Sw+ line of the appropriate panel is determined by the group of relays OHN, OH1T and OH2T. Furthermore, that an effective switch by which the odds requesting keyboard machine is provided with a signalling path to the exclusion of all other machines is represented in the operation of relays O/B$^1$ and O/B$^2$, which are in fact a double windings relay.

FIG. 19 shows a number of jacks in its lower half which are labelled with the betting odds commonly used by bookmakers in betting transactions on race courses. Each of these jacks has a pair of contacts which are normally open but may be bridged by the insertion of a solid copper slug in the jack. Thus, as the result of the circuitry so far described marking potential is connected to one, a common, side of each of the contacts associated with the jacks. There is an individual panel, such as that illustrated in the figure, for each contestant number and by virtue of the function of the relays O/B$^1$, O/B$^2$ and OHN the panel corresponding to the contestant number keyed on the keyboard is connected in circuit. If either by manual means or automatically the contacts associated with odds of 2 to 1 are bridged, these odds are signalled to the requesting keyboard machine in the following way.

Positive potential passes through the 2/1 contacts of the indicator to 2/1L line and thence operates relay 2/1 shown in FIG. 20. The circuits of this figure are provided for the purpose of encoding the odds into certain basic units so that each is expressed in such terms for operation of appropriate relays which it will be seen are associated with the odds indicator lamps of FIG. 17. The code universally used throughout this description is, e.g.:

$$1=U1$$
$$2=U2$$
$$3=U2+U1$$
$$4=U4$$
$$5=U5$$
$$6=U5+U1$$
$$7=U5+U2$$
$$8=U5+U2+U1$$
$$9=U5+U4$$
$$10=1T$$
$$11=1T+U1$$
$$13=1T+U2+U1$$
$$16=1T+U5+U1$$

etc.

The relay shown in FIG. 20 have inputs common to all contestants' odds and profit panels, while their outputs are multipled to all keyboard machines. However, as previously observed the O/input relay (FIG. 21) of the particular keyboard machine requesting the odds is operated to provide a return path for the answering signal from the control unit.

By closure of the contacts of relay 2/1 (FIG. 20) potential is applied to lines U2 and ?/1. Through the O/input relay (FIG. 21) and lines 2UL and —/1L, lines U2 and ?/1 are connected to and operate relays 2UL and —/1L relay 2UL in changing over its first contact connects potential to line 2y which is connected to the lamp labelled "2" of the indicator lamp panel (FIG. 17) at the keyboard machine. Relay —/1L when operated changes over its contacts and in so doing connects potential to line —/1LL which is connected to lamp labelled "To 1". In order to complete the lamp indication of the odds, in the present instance, the lamp labelled "No" in the right hand column is illuminated through marking potential applied to the line 00 over the first making contacts of relay 1HL (FIG. 21) and line N to which potential is applied across a series connection of each of the lowermost contacts of the tens and hundreds relays in the third group shown in FIG. 21. Hence, it will be seen that if the odds involve the use of a tens digit then potential is disconnected from the lamp "No" and illuminates an appropriate one of the other lamps in the right hand column of the indicator panel.

Therefore, by illumination of the lamps referred to a visual indication is given of the odds available for the contestant number keyed on the keyboard, which odds are now shown as being 2 to 1.

In this way by depressing the contestant keys successively before betting transactions begin, the odds to be advertised for each contestant may be obtained by the keyboard operator and displayed to prospective customers. It will also be appreciated that each time the contestant keys are operated for the registering of a wager the odds on that contestant will also appear on the indicator panel so as to provide a check by the operator on the odds to be laid in the wager.

It is preferred that the odds indication provided by the illuminated lamps persist for as long as the respective contestant number keys are depressed. Upon keying of a further contestant number, however, the lamps should be extinguished and relit in accordance with the odds available on the new contestant number. For this purpose, a relay O/Reset (FIG. 21) and relay FR of FIG. 18 are provided with associated lines RS and CO/FR shown in FIG. 21.

It will be appreciated from the foregoing description that the relay O/Imp of FIG. 18 locks on over the normally closed lowest contact of relay FR to obtain a signalling path from the keyboard machine to the control unit, which in turn results in the operation of the relays $O/B^1$ and $O/B^2$. Now with reference to FIG. 21 it will be seen that individual locking circuits for all of the lamps relays in the three groups are provided via their lowermost contacts through the line RS which receives marking potential when the relay O/Reset is in its relaxed condition. However, while the relay O/Imp (FIG. 18) remains operated the relay O/Reset is also operated thus disconnecting potential to the line RS.

As the relays of the left hand group, i.e. relays —/4L to —/1TL shown in FIG. 21, operate in response to a signal concerning odds transmitted from the encoding circuit of FIG. 20, potential is applied via the upper contact of the relay of this group, now operated, to the line CO/FR which brings up a release relay FR over the lower contact of the relay $O/B^1$ shown in FIG. 18. Immediately relay FR operates the relay O/Reset of FIG. 21 relaxes and locks in each of the odds relays operated in response to the signals from the encoding circuit of FIG. 20. Also with the operation of relay FR of FIG. 18 the locking circuit of relay O/Imp is broken thus removing the marking potential on line O/A and allowing the stepping switch C55 (FIG. 9) at the control unit to continue its hunting around its banks of contacts. This keyboard machine is now disconnected effectively from the control unit as it will be seen that relay O/Input (FIG. 21) providing a return signalling path is also released, but the lamp indication of odds on the contestant recently keyed will persist. This is due to the locking up of the respective relays associated with the lamps. If the operator of this machine now operated the contestant keys on his keyboard the O/Imp relay is again brought up with consequent operation of relay O/Reset (FIG. 21), the FR relay of FIG. 18 having been deenergised with the dropping out of relay $O/B^1$. The operation of relay O/Reset this further time disconnects the locking potential from the lamps' relays so that all lamps are extinguished pending receipt of a new indication of odds relevant to the contestant number now keyed.

*Profit or loss subtractor*

As described so far in the preceding passages the apparatus will provide the bookmaker at the control unit with a visual indication of the total "take" on the projected contest and also the total "pay" in respect of each contestant so that by mental calculation he may estimate his profits, and losses, in regard to the betting transactions on each contestant. However, where a large number of contestants are entered for the event and the totals of the betting transactions are continually fluctuating, it may be difficult for a bookmaker to be able to keep a constant check on his liabilities and profits.

It is therefore, proposed that the subtraction calculations on each contestant be effected automatically and the result indicated visually, preferably in red (indicating loss) and green (indicating gain) lights. It will be possible by this facility to provide an instant indictaion to the bookmaker of the state of betting on each contestant whereby any necessary adjustment of odds may be calculated and signalled to the keyboard machines.

The subtractor unit is shown in FIG. 22 one of which is provided for every contestant with the input thereto derived from the "take" accumulator, multiplied to all subtractors, and also from the "pay" accumulator of the respective contestant No. The output from each subtractor is permanently connected to its associate odds and profit indicator panel. It consists of pairs of relays for values £100, £200, £400, £500, £1,000, £2,000, £4,000, £5,000 and £10,000 with three borrowing relays between the £400 and £500 pairs for the purpose of borrowing the next highest quantity when the next number is not a continuation of the binary progression as used. In each pair there is a pay relay (P) and a take relay (T). The pay may be subtracted from the take or vice versa; in which case a result of such substraction is obtained by applying potential to lines 1R, 1RA representing £100 in the remainder value, 2RA representing £200 and so on.

If the "take" is larger than the "pay" and out-put relay ($x2$) operats as shown in circuit FIG. 22 giving a profit result (M). If the "pay" is greater than the "take," and ($x1$) out-put relay operates giving a loss result (L). These results may be connected to an automatic odds adjuster unit, to be described later, as well as to indicator lights.

An example of the operation of the subtractor shown in FIG. 22 will now be considered in which it is assumed that the take is £1000 and the pay is £500. In the case of the £1000 amount a particular marked output will be indicated by the total take accumulator and similarly a marked output of £500 will be indictaed by the pay accumulator associated with the particular contestant, in this instance assumed to be contestant No. 1. The marked output from the take accumulator is connected to the second contact of the B winding of a bank of three input relays while the output from the individual pay accumulator is connected to both the fifth and sixth contacts of the A winding of the input relay. The first two of these three contacts are normally closed, so that the line T1000 arriving from the take accumulator is connected to line T1000R to operate the relay T1000R and the line P500 from the pay accumulator is connected in a similar way to relay P500R. It will be noticed that the line P500 connected to the upper contact of the input relay is not connected to the line and relay T500R in the normal condition of the input relay.

Through operation of relay T1000R potential is applied through the fifth contact of the relay to line T$x$ and thence via numerous normally closed contacts to the line $x$ associated with the fifth contact of relay T10,000R, through the $x$ line at the first contact of the Y relay and via its normally closed fourth contact to line $x2$ which in turn operates relay $x2$.

Also due to the operation of relay P500R potential which is extended through normally closed contacts to line H$x$ is now connected via the first contact of relay P500R, now making in an upper position, to line 5R$a$ which is extended to the one side of the forth contact of relay $x2$. Relay $x2$ which is now operated as described above connects the potential from line 5R$a$ to the output line M5 which is connected to the pair of green lamps labelled "500" on the main indicator panel so that these lights are now illuminated to indicate to the bookmaker that a potential profit of £500 exists as a result of the betting transactions up to that time on the No. 1 contestant. Two lamps are preferably used to avoid confusion in the event of one becoming faulty.

Now, let it be supposed that the take output line from the accumulator is T200 and not the marked T1000 referred to above. It will be seen, therefore, that on the No. 1 contestant a potential loss of £300 is existent.

In the example case discussed above it will be seen that where the take was £1000 that the relay T1000R through its fourth contact breaks the circuit to the TY line to prevent its marking by potential upon change over of the third contact of the relay P500R. In the present example it will be observed that the line T200 corresponding to a take of £200, that is less than the pay for the contestant is located to the left of the relay series shown in the figure and thus there is no interruption in the line TY.

Therefore, upon operation of relay P500R potential is applied through its third contact to the line TY which momentarily places potential upon relay SYR through line SYR connected to the spring contact of the fourth contact of relay T10,000R. Simultaneously the lines 50R$a$ and 100R$a$ connected to the second contacts of relays T5,000R and T10,000, respectively, receive potential from line TY, but as will appear clear shortly this is only a momentary impulse which is not maintained.

When the slow release relay SYR operates it connects potential to the operating coil of relay Y by line YL thus effecting change of all of its associated contacts. Through the second contact of the relay Y potential is applied for the operation of all of the three input relays which through the agency of winding A connects the accumulator output line P500 to operate relay T500R and the output line T200 from the take accumulator to relay P200R, thus, effectively transposing the take to pay and vice versa whereby a suitable subtraction may be achieved.

In the first place potential is applied through the first contact of relay P200R to line 2R which through the normally closed contact of relay HY marks the line 2R$a$ extended to one side of the normally open contact to relay X1. Simultaneously operation of relay T500R through its fifth contact connects potential to line TX which is in turn led to line X at the fifth contact of relay T10,000R, which is also extended to the second contact of the relay Y. Furthermore, potential is removed from line TY by the change over of the fourth contact of relay T500R so that the energization of slow release relay SYR is removed. During the release of this relay, relay Y locks up by its first contact to the marked line X which also applies potential across the fourth contact of the relay Y to line X1 and relay X1. With operation of relay X1 the mark contact 2R$a$ is connected to line L2 to light this lamp which indicates visually by a red lamp that a loss of £200 exists on the betting transactions in connection with the contestant No. 1.

As relay P200R operates through the change over of the contacts of the input relay potential is applied through its third contact to relay HY which through its second contact maintains line 2R$a$ in a marked condition while line N1R is connected to line 1R$a$. Since through the normally closed first contacts of relays P100R and T100R line N1R receives potential, the line 1R$a$ is marked additionally to line 2R$a$ so that line L1 also receives potential to light the red lamps labelled "£100." The two sets of lights now illuminated will indicate to the bookmaker that he stands to lose £300 on the wagers so far made on contestant No. 1.

From an examination of FIG. 22 it will be seen that in the normal condition of all relays the zero lines H$\phi$ and T$\phi$ all receive potential to illuminate the white lamps labelled "zero" on the indicator panel shown in FIG. 19. It will also be seen that with the operation of any pay or take relay that these lines are broken unless the value of the pay and take relays correspond in which case the net result to be indicated to the bookmaker will, of course, be zero.

*Automatic odds adjuster*

As a further assistance to the bookmaker in his control of transactions handled by the apparatus an optional feature may be incorporated from which is derived automatically an adjustment to the odds on offer for each contestant in dependence upon the extent of profit or loss indicated by the result signalled from the respective subtractor. With the incorporation of this equipment it is intended that the initial opening odds for betting be set manually by the insertion of solid copper plugs into a respective odds jack in the indicator panel associated with each contestant number as previously described in connection with FIG. 19. For instance from an anticipated favouritism listing of all contestants in the forthcoming event, which is supplied to the bookmaker before betting transactions begin on the race course certain odds are arrived at consistent with the contestant's estimated chances of winning the contest. In the above description it is supposed that on No. 1 contestant odds of 2 to 1 are available and have been advertised. In such an instance a conductive plug will be inserted into the jack on the indicator panel (FIG. 19) which is labelled "2/1."

The equipment provided for this automatic adjustment of odds is shown in FIG. 23. It presupposes that a predetermined change in profit or loss on any contestant results in an automatic adjustment of odds. This circuit is equally suitable for response to various values which can be predetermined by appropriate arrangement of the apparatus. A separate circuit of this kind is provided for each contestant No.

Referring to FIG. 22 some of the lines L1 to L50 associated with relay X1 and some of lines M1 to M50 associated with relay X2 besides connection to respective lamps on the indicator panel are also connected to the operating coil of similarly identified relays in FIG. 23. Potential upon line L1, besides indicating a loss of £100 at the lamp panel (FIG. 19) is also connected to relay L1 of FIG. 23. It will be understood that when betting commences none of the relays L1 to M20, FIG. 23 will be operated and as the BRK relay is also unoperated the line $\phi$ at the first contacts of L1 is marked and that relay $\phi$R will therefore operate via the second normally closed contact of relay 1UR, line $\phi$L and the first normally closed contacts of relay $\phi$R, which contacts are a make before break type. When relay $\phi$R operates the moving contact of its first pair of contacts makes on its normally open contact before leaving its marked normally closed contact. Now it will be seen that this normally open contact is connected to a marked line LK which receives its potential from the first contact of relay BRK. Relay $\phi$R will then become and remain locked on until relay BRK is operated to remove the marking of line LK.

Assuming that FIG. 23 represents the automatic odds adjuster for contestant No. 1 and that as a result of betting transactions No. 1 shows a loss of £100 then relay L1 will be operated as a result of marking of line L1 from FIG. 22. When relay L1 operates it will disconnect potential from line $\phi$ but no change will occur in the train of relays 6DR to 5UR of FIG. 23 and relay $\phi$R remains locked on.

The coil of relay $\phi$R is also connected by line to the first contact of output relay winding B the purpose of which will be explained later. If the loss on contestant No. 1 increases to £200 line L2 is marked and its associated relay L2 operated. Potential is now applied across the normally closed first contacts of relay BRK to line −2. However, at this stage marking on line −2 serves no purpose as the line is now open at the second contacts of relay $\phi$R which has been locked on, so that potential is isolated from the relay 1DR normally associated with line −2.

If, on the other hand, line L4 is marked and associated relay L4 operated potential is applied across the normally closed first contact of relay BRK to a line −4 which through the closed second contact of relay 1DR applies potential to the winding of relay 2DR and marks the line 2DR connected to the normally open fifth contact of the left hand A winding of the output relay.

The relay 2DR and all D and U relays in this relay train operate in the same way as that described for relay $\phi$R. Examination of the L1 to M20 chain of relays will disclose that only one line of the −2, −4 ... $\phi$, +2 ... +30 lines can be marked at any one time, and as line −4 is the line now marked and as a result relay 2DR operates it will be understood that relay $\phi$R remains locked on from line LK and its first contact.

Now with relay 2DR operated and line −4L marked potential is applied via the fourth contact of relay 2DR to the lower fifth contact of relay 2DR now open and isolated from the contacts of other relays to the right hand side of the chain and consequently isolated from the line ZG. Potential is also applied from the marked line −4L via the third contact of relay 2DR and the lower sixth contact of relay 2DR, the sixth contact of relay 1DR the sixth contact of relay ϕR now operated, to a line ZR and the coil of a relay ZRR. When relay ZRR operates a line RO/CL is marked by its third contact for signalling a reduction of odds as will be described later. Also a line BRK is marked to operate the relay BRK which when operated disconnects potential from the normally marked line LK and also to the line −4. Relays ϕR and 2DR will now release and with potential disconnected from line ZR, relay ZRR will de-energize. The BRK relay will then return to normal and the LK line and −4 line will again receive marking potential. Relay 2DR will again operate due to the persistance of marking potential on line L4 and become locked on.

The same procedure is followed wherenever a relay is operated representing a greater loss or a smaller profit than the relay previously operated and consequently becomes locked on.

If, on the other hand, it be assumed that a new relay is operated as a result of a reduction of loss, or an increase in profit, for example, assuming that with the 2DR now locked on the loss is reduced to less than £400, then the line L2 will be marked from the subtractor (FIG. 22) and relay L2 (FIG. 23) will be operated, marking line −2 which via the second contact of relay ϕR (not operated) will cause the operation of relay 1DR. Now the marked line −2L applies potential via the third contact of relay 1DR to its sixth normally closed contact now open, but as no relay is operated to the right of relay 1DR potential is isolated from line ZR.

However, potential from the marked line −2L via the fourth and fifth contacts of relay 1DR and the fifth contact of relay 2DR, still locked on, potential is applied to the line ZG thus operating relay ZGR and a line GO/CL is now marked by the second contact of this relay to signal an increase in odds as will be described later. The relay BRK is again operated and the relays 1DR and 2DR will drop out as already disclosed and relay 1DR will then be again operated and lock on due to the persistence of marking potential on line L2. It will be seen that the progressive profit and loss values used for automatic changes of odds varies. This is because in bookmaking it is customary to vary the odds more rapidly when a contestant is showing a loss. It will be seen by a study of FIG. 23 that in the example given a loss of £400 is incurred before a decrease in odds occurs, but that if a further loss of £200 occurs making a total loss of £600 a further decrease will be signalled because the line −6 is connected directly to the relay 3DR's first contact instead of passing via the second contact of relay 2DR. Also after the first £500 of profit increasing profit adjustments are in steps of £500. These values are merely given as an example of the operation of the equipment and may be varied as required.

As previously described with reference to the feature involving request for odds by a keyboard machine, potential is applied to line CO/SW+, which is shown in FIG. 23 is now connected to the windings of two coupled windings of an output relay instead of directly to line as is shown in FIG. 19. Operation of the A winding of the pair now connects potential to the line CO/SW+ in FIG. 19 and also the line 2DR to line D2 thus marking the latter. With reference to FIG. 24 it will be observed that a number of relays corresponding to individual odds are provided each of which has a double winding paired as A and B with seven or eight contacts associated with each. This is merely for convenience and efficient operation, although if desired the fifteen or sixteen pairs of contacts may be operated by a single relay winding. As the odds can only be obtained in respect of one contestant at any one time as described with reference to FIG. 18 and FIG. 19, only one group of relays as shown in FIG. 24 is required and is common to all contestants. The contact pairs as shown in this drawing are normally open but by the insertion of a solid copper plug in any of the odds jacks of each odds and profit panel will cause operation of the corresponding relay and closure of its sixteen contacts when potential is applied to mark line CO/SW+ (FIG. 19) of the particular contestant for which odds are being requested by a particular keyboard machine. In the example under consideration a 2/1 relay will be operated and since the horizontal line D2 extended from FIG. 23 is marked as described the odds for the contestant which will be signalled back to the keyboard machine is now 13 to 8. This reduction of a ⅜ point in the original 2 to 1 odds has been in response to a calculated loss of £400 in connection with the wagers so far transacted on the contest in respect of one particular contestant.

With reference to FIG. 23 it will be observed that through the normally closed first contact of each of the L or M relays that potential is normally applied to the line ϕ. Therefore, with the marking of this ϕ line and the relay ϕR operated the line ϕR is marked and when the A and B output relays are operated a line ϕ is marked by the first B winding contacts and this ϕ line is commoned to one side of a corresponding pair of contacts of each of the odds relays shown in FIG. 24, one side of the ninth contact of relay 2/1 has positive potential from the ϕ line which is transferred to the ordinate 2/1 of the circuit arrangement. This then is normal condition of both circuits shown in FIGS. 23 and 24 when a profit or loss on a respective contestant is less than £200 or in some cases less than £400.

The example given is in respect of a loss of £400 with the coresponding operation of relay L4, but from a reference to FIG. 23 it will be seen that the gain relays which are labelled with the prefix "M" place potential upon corresponding "+" lines. For instance if relay M5 of FIG. 23 is operated due to the indication of profit from the betting transactions on that contestant of £500, and line +5 is marked which may be traced through the circuit in the same way as the previous example to obtain operation of relay 2UR and subsequent marking of line U2 which is extended to a simliarly identified ordinate in FIG. 24. Hence the manually set odds being 2 to 1 on the contestant with corresponding operation of relay 2/1 of this circuit, then the ordinate line 5/2 becomes marked so as to signal to any keyboard machine requesting the new odds of 5 to 2 which represent an increase in odds of two ¼ points, or in other words two increasing steps in the betting odds of which the apparatus is adapted to provide.

As previously described in connection with the feature of odds signalling from the control unit, the connection of the CO/SW+ line via the odds switches of the odds and gain panel shown in FIG. 19 is direct to the odds encoding unit shown in FIG. 20. However, with the incorporation of automatic odds adjustment in the apparatus the relays and their contacts shown in FIG. 24 are interposed in the connection to the odds encoding unit of FIG. 20. Thus the marking potential applied to the encoding unit is applied through the contacts of the odds relays of FIG. 24 so that the line marked is not the one associated with the manual setting of the odds panel but rather the ordinate line of the odds relays to which the marking potential has been automatically applied by the functioning of the automatic odds adjuster circuit of FIG. 23.

From the two examples above described in relation to the automatic increase and decrease of odds from the manually set odds of 2 to 1 it should be clear how odds represented by any of the odds relays may be automatically adjusted. The automatic odds adjuster circuits (FIG. 23) which are individual to each contestant number are preferably mounted behind the odds and gain panel (FIG. 19) on a mounting bay at the control unit.

With reference to FIG. 23 it is to be noted that the third and fourth contacts provided on some of the profit and loss relays such as M5, M10, L1, L2, L4 and L5, are intended for addition of the profit or loss values indicated by the operation of these relays. For instance, it will be seen that by simultaneous operation of relays L1 and L5 that potential is applied through the now changed over third and second contacts respectively of these relays to the line —6.

*Odds change alarm*

A further feature may be incorporated in the apparatus by which provision can be made for signalling to all keyboard machines and an aural and/or visual indication of a change in odds may be given on one or more contestants. As a preferred form of such equipment it is proposed that an increase or decrease in odds be signalled by illumination at each keyboard machine of lamps outlining the number of the contestant on which a change in odds has occurred. With reference to FIG. 17 the right hand indicator lamps labelled "G/NO." are arranged to signal by green lamps the number of the contestant on which an increase or gain in odds has occurred, while the "R/NO." indicator lamps on the left of the panel signal in red lamps the contestant number on which the odds have now been reduced. Due to the greater importance of the latter information a buzzer may be connected with the red lamps so as to draw immediate attention to the condition. Preferably the buzzer and the lamp indication operate continually until the signal has been acknowledged by depression of the respective manual button RS or GS. It is intended that the operator then keys up on his keyboard the particular contestant number indicated by the lamps and thereby obtains the fresh odds available as already described.

The electrical circuitry associated with the alarm system is principally illustrated in FIGS. 23, 25 and 26 of the drawings. Generally speaking the circuit functions by operation of two relays of the chain of relays 1UR to 5UR $\phi$R, or 1DR to 6DR shown at the bottom of FIG. 23 as previously explained, and as a result of which one or the other of relays ZRR or ZGR will be operated. As previously explained, one function of the operation of either relay is to operate relay BRK which disconnects the marking potential applied to the contacts of the profit and loss relays so as to isolate from the alarm circuit further fluctuations which may occur in the profit or loss result on the contestant, while alarming of the keyboard machines is in progress. As mentioned above a buzzer at each keyboard machine may be energized and this is done through a contact of the "red" alarm relay ZRR.

The circuit shown in FIG. 25 is merely illustrative of the actual circuit which would be employed in practice. As depicted it relates to the use of only two keyboard machines in the apparatus and operates only in respect of a "red" odds reduction alarm. However, by reference to this circuit a clear understanding of the equipment required for the apparatus in service should be obtained. The addition of further keyboard machines and alarming for odds increase is an obvious development of the circuit shown. The relay CLR provides potential, in its de-energized condition, for the stepping switch RO55, so that during release of this relay the switch is continuously hunting over its bank of contacts of which three banks are used. It may be desirable to provide a manual switch on the apparatus which arrests the hunting action of the switch RO55 and may be operated by the bookmaker whenever he desires signalling of an odds adjustment to his keyboard machines. The relays R/1KM and R/2KM are each individual to a respective keyboard machine and become operated when the acknowledgment key RS or GS is depressed at the respective machines. The interconnection of these two relays is such that operation of the release relay CLR is not effected until all keyboard machines have acknowledged the odds change alarm. The two pairs of relays in FIG. 25 designated No1 and No2, respectively, are associated with the automatic odds adjuster equipment of the corresponding contestant number. Thus there will be a separate pair of relays RO/CR and R for each contestant number.

With each change of odds on any contestant number, marking of the corresponding contact is effected in the first bank of contacts of the stepping switch RO55. This switch, as explained above with reference to switch CO55 of FIG. 9 will hunt over its contacts and will come to rest upon the first marked contact in its contact progression whereby through operation of the corresponding relay or group of relays labelled RU1 to RU0 and GU1 to GU0 in FIG. 26 the appropriate lamps will outline the contestant number on the lamp panel at all keyboard machines.

As an example of the operation of the odds change alarm circuit it will be supposed that a loss of £400 has been indicated at the output of the subtractor of one contestant, say contestant No. 1. As already explained relay ZRR (FIG. 23) will be operated. By the first contact of this relay potential is applied to the isolating relay BRK, by its next contact potential is applied to the common buzzer line COM BUZ and through its upper contact potential is applied to line RO/CL which is extended to the operating winding of relay RO/CR associated with the No. 1 contestant and shown in FIG. 25. With the operation of this latter relay it firstly locks on over its first contact and applies potential to contact No. 1C of the stepping switch RO55 by its upper contact, and through its second contact it connects line Z+L to No. 1+ line associated with a contact in the same level but in a second bank of switch RO55. A further contact on the same level but in a third bank of the said switch is connected to a line No. 1RL which is in circuit with the operate winding of relay R. As the switch RO55 steps on to the marked contact No. 1C and remains there its two wipers B and D being bridged interconnect the lines No. 1+ and No. 1RL. With the change over of the contacts of the now operated relay R potential normally applied to lines X+L through the normally closed contacts of the release relay CLR ensures continued locking of relay RO/CR, potential continues to be applied to the line No. 1+ to lock the relay R up. Through the upper contact of relay R line RU1L receives potential which being connected to the winding of relay RU1 in FIG. 26 effects change over of its contacts in a manner which is well known to provide illumination of lamps C, F, L and S to flash the numeral 1 in red on the lamp indicator "R/No." (see FIG. 17) at all keyboard machines to indicate that the odds on that contestant have now been reduced.

Through the first contact of relay RU1 potential is applied to line RSW which through operation of the manual switch RS at the keyboard machine transfers the potential to line R/1KM to operate the corresponding relay in FIG. 25. Operation of this relay alone does not affect the locked condition of the circuit shown in the figure but when all keyboard machines have their corresponding KM relays operated the relay CLR is operated by potential applied over their second contacts so as to continue the stepping of the switch RO55 beyond the marked contact associated with its wiper A. The breaking of the bridge between contacts No. 1+ and No. 1RL will release the entire circuit shown in FIG. 25 so that any odds change condition stored in other RO/CR relays or GO/CR relays may be selected by the switch RO55 to provide for signalling of that condition to all of the keyboard machines. The two pairs of relays R+1, R+2 and G+1 and G+2 of FIG. 26 it will be seen from close inspection are associated with the illumination of the numeral 1 or 2 in the tens digit of the lamps "R/No" and "G/No," respectively.

*Wagers at special odds*

It is customary for bookmakers to offer special wagers to customers which are intended for convenience of accounting and also slightly favour the customer. For instance a wager of £8 at odds of 6 to 1 would normally involve a potential winning amount of £48. However. for the bookmaker's convenience special odds of £50 to £8 are often offered the customer, in some cases even as an inducement for him to increase his intended stake. Similarly other special wagers of 50 to 7, 50 to 6 and 50 to 4, 100 to 11, 100 to 9, 100 to 7 and 100 to 6, 200 to 6 and 400 to 6 are used in the betting transactions. It is usual to allow such wagers to be made in shillings, pounds, tens of pounds or hundreds of pounds, and repeated up to four times.

As an optional feature of this apparatus special wagers of the above kind may also be offered to customers. The indicator panel shown in FIG. 17, has rows of lamps at its bottom to indicate by illumination the special odds simultaneously with indication of the corresponding conventional odds. That is, if for instance odds of 6 to 1 are indicated by illumination of appropriate lamps in the central columns of the panel, illumination of the lamps labelled "50/8" will also occur. Thus the operator of the keyboard machine has his attention drawn to the fact that the odds to be offered on the particular contestant are 6 to 1 but, additionally, wagers may be accepted at the special odds of 50 to 8.

These latter odds are, of course, slightly greater odds than the 6 to 1 odds advertised and a customer is given the option of taking advantage thereof if he makes the wager a specified number of times, for example once, i.e. £50 to £8, twice i.e. £100 to £16 and four times i.e. £200 to £32. Furthermore, if desired, wagers of a similar kind may also be placed in shillings or other value as mentioned above similarly, once, twice and four times. The sets of keys at the keyboard machine (FIG. 2) are so arranged that wagers of this kind may be registered. For instance, an appropriate one of the upper four keys in the column OK1 must be depressed, the uppermost key labelled "0" in column OK2 and the appropriate key in column OK3. In order that correct registration of the wager is effected by each keyboard machine, keys in the two columns of stake keys also must be depressed. Any one of the keys labelled "SH", "£," "£00" and "£00" of column SK1 must be depressed depending upon whether the wager is in shillings or pounds etc. together with the respective one of the upper three keys of column SK2, which correspond to the number of times the wager is accepted, i.e. once, twice or four times respectively.

The lines connected to the special wagers lamps on the indicator lamp panel shown in FIG. 17 are the lines 6/1, 7/1, 8/1, etc. to which potential is connected for the illumination of the respective special wagers lamps through operation of one or more of the grouped relays —/1LL, O/50, O/100, O/200 and O/400 shown in FIG. 27. As previously described in connection with the illumination of the conventional odds lamps in the central columns of the indicator lamp panel, potential is applied to the lines —/1LL and 6Y of FIG. 21 if the available odds are 6 to 1. Marked line —/1LL also operates relay —/1LL (FIG. 27) and the potential on line 6Y is connected to line 6X through the fifth contacts of relay 1TL (FIG. 21) which in turn through the lowermost contact now closed of relay —/1LL (FIG. 27) connects this potential to line 6/1. Potential thereon is applied to the special bets lamps labelled 50/8 to cause them to light. Should a customer wish to avail himself of the special bets on offer the wager may be registered by the keyboard operator by depressing the respective contestant number keys in columns CK1 and CK2, depressing odds keys "50," "0" and "—/8" of columns OK1, OK2 and OK3, respectively, and also the stake "£" key of SK1 and "4T" key in column SK2 if the wager is to be taken four times and in pounds. Through the contacts 9 of each of these keys potential is placed upon lines O/50, OR, O/8, S£ and S4. The line O/50 is connected to the operating winding of relay O/50 and through its uppermost contact, now closed, applied marking potential to a line O5L. This line O5L and the lines specified connected to the contacts 9 of the keys are coupled to respective contacts of the bets relays of FIG. 7. The marking potential of each of these lines is in turn communicated to the control unit upon operation of the bets relays for registering particulars of the wager in the control equipment in the manner described previously. Briefly, registration at the control unit occurs as follows. A more complete description may be obtained by reference to the chapter of this specification entitled "Multiplier Equipment."

The marked line ORL from the fourth contact of the D winding of the bets relays operates a relay OR (FIG. 11), marked line O/8L from the bets relays operates a relay O/8, marked line S£L operates a relay S£ (FIG. 13), while marked line S4L operates a relay S4 (FIG. 13). Operation of this latter relay does not serve any effective purpose in the present instance and may be disregarded. This will be appreciated by observing that its output contacts are connected to normally open contacts of relays all of which remain unoperated in the present example. The line O5L through the now closed fourth contact of relay OR (FIG. 11) and the now closed uppermost contacts of relay O/8 applies potential to B58 to operate a relay B58 (FIG. 12) which via its uppermost contact operates a relay XR. These two relays now supply potential to the A, B and C value lines equivalent to the base value 58 as previously described with reference to this figure. Relay B58 also through its seventh pair of contacts marks line S5A which is a stake value to be referred to later.

The marked line S4L as well as operating relay S4 of FIG. 13 is also connected to one side of the fifth contact of relay S£ which due to its present operation supplies potential to a multiplier line X4 which in turn operates relay X4 (FIG. 15). Relay S£ through its three uppermost contacts also supplies potential to the lines SB+1, SB+2 and SB+3 which in turn mark lines S8b, S1a and S2a through individual contacts of the relay O/8 of FIG. 11. The first of these lines S8b will be seen to be connected to contacts of the X½ and X¼ multiplier relays, which are not operated in this example and thus does not perform any effective purpose. On the other hand the lines S2a and S1a operate two relays S2a and S1a respectively in FIG. 13 and through the now closed contacts of these relays potential is applied to the lines S10F and S2F. It will be noted that potential is also applied to lines S5D and S1D but this may be disregarded in the present example as the D lines are used only in connection with the X2 multiplier relays which are not now operated.

The lines S10F and S2F now marked and line S5a from relay B58 (FIG. 12) are connected to one side of normally open contacts in relay X4 (FIG. 13) which is now operated as explained above, whereby potential is applied through its closed contacts to lines 10T, 2T and 20T respectively, which represents a total value of £32, this being the value of the stake invested which is now transmitted for registration by the "Take" accumulator and by the respective contestant number "stake" accumulator. Simultaneously potential from the a value lines a50, a5, a2 and a1 from relays xR and B58 (FIG. 12), is connected so that line a50 through the second contact of the B winding of relay x4 (FIG. 15) now operated, applies potential to a line 200P; line a5 operates a relay a5 (FIG. 14) and through a line Y receiving potential from the normally closed second contact of relay a20 connects this potential via its first contact to a line 20F which in turn applies the potential through the now closed sixth contact of the A winding of relay x4 to line 20P. Also lines a2 and a1 operate relays a2 and a1 respectively (see FIG. 14). Via their now closed contacts they supply potential to two lines 2F and 10F which also through the agency of now closed relay x4 connects potential to lines 2P and 10P. The output lines from the two x4 relays of FIG. 15 being marked as above described have now been shown to be 200P, 20P, 10P and 2P thus representing a total "Pay" value of £232, which is correct for the Pay value in the example given. These values are transmitted for registration to the respective contestant number pay accumulator.

*Safeguard against operation of incorrect keys*

It will be appreciated that due to the complexity of the keyboard at the disposal of the operator at each machine, errors may sometimes occur which could result in the registration of an incorrect wager. It would be a difficult task to recall the incorrect wager for correction after it has been registered and this could also lead to the wastage of considerable time. Some measure of protection should also be afforded to prevent unauthorised bets being deliberately placed. A further feature may be incorporated in the apparatus to safeguard against against the registration of incorrect wagers, particularly those which may result in the registration of incorrect betting odds in respect of the wager, but also those wagers at such high stakes as to involve a liability of excessive loss. For this purpose the keys in columns OK1, OK2 and OK3 of the keyboard are each provided with additional contacts 10 and similar contacts 10 are also supplied to the stake keys in columns SK1 and SK2. The functioning of the equipment for safeguard against registration of incorrect betting odds will now be described.

With reference to FIG. 28 it will be seen that potential is applied to one side of the upper contacts of relay MR and the other side of some of these contacts, which are normally open, is connected to the winding of the motor 46 of FIG. 5, which provides the power for printing of the betting ticket shown in FIG. 6. The clutches 43S and 53S are connected to the other side of others of the normally open contacts of relay MR so that when potential is applied thereto by the operation of relay MR the windings 43S and 53S are energized in order to release the clutches 42 and 52, see FIG. 5. According to the preferred form of the safeguard circuit now to be described the operation of the relay MR is controlled manually from switch MSW mounted on the keyboard panel shown in FIG. 2, but the operating potential applied through this switch MSW passes via normally open contacts which it is arranged are closed only if the odds keyed for the particular wager correspond with those signalled from the control unit and indicated by the lamps on the indicator panel shown in FIG. 17. As previously described, in some instances alternative odds i.e. special bets, are available together with the conventional betting odds. Because of this the safeguard equipment becomes more complicated but the safeguard against false registration is equally effective regardless of whether the wager keyed involves conventional odds or the odds associated with a corresponding special wager. It should be noted that any special wager will involve the depression of an appropriate one of the four uppermost keys of column OK1, which are labelled "50," "100," "200" and "400." A pair of special relays SPEC R, FIG. 27, are provided to cover the contingency of the choice of a special bet in preference to the conventional odds available, and these relays it will be seen, are energized upon operation of any one of the four said keys in column OK1 which cause operation of the corresponding relays in the group of relays of this figure.

With reference to FIG. 21 it should now be clear that the three left hand groups of relays therein depend for their operation upon the marking potential applied thereto in response to the signalling of odds from the control unit. For instance, if the odds signalled are 6 to 1 the relay —/1L in the first group is operated, and relays 5UL and 1UL are both operated in the second group. The indicator lamp labelled "6" is lit by potential applied through the first contacts of relay 5UL and the third contacts of relay 1UL via line 6Y. Simultaneously the indicator lamp labelled "Tol" is also illuminated by potential applied through the second contacts of relay —/1L via line —/1LL. It has already been disclosed that with the marking potential on the line —/1LL relay —/1LL (FIG. 27) is also operated thus applying potential potential from the marked line 6Y through line 6X via the normally closed contacts of relay 1TL (FIG. 21) and the first contacts of the operated relay —/1LL to line 6/1 to light the special odds lamps labelled "50/8." By tracing the circuit arrangement of FIG. 21 with signalling from the control unit of different betting odds, it will be realised that indications of a variety of conventional odds and special wagers may be obtained on the indicator panel of FIG. 17. The odd numerals, that is those involving the combination of two or more relay operations simultaneously are obtained in accordance with the encoding system described in connection with FIG. 20.

For an example function of the safeguard circuit it will be assumed that a particular contestant number has been keyed on the keyboard in respect whereof conventional odds of 6 to 1 have been signalled to the particular keyboard machine. As described above, therefore, relays —/1L, 5UL and 1UL of FIG. 21 and relay —/1LL of FIG. 27 are operated which have had the effect of indicating to the operator such conventional odds and alternative special betting odds through the medium of his indicator lamp panel. If, now, a customer wishes to make a wager of £1 stake money at the available odds of 6 to 1, the operator, having depressed the relevant contestant keys proceeds to depress the odds keys "No" in column OK1 "6" in column OK2 and "—/1" in column OK3. The value of the stake involved in the wager is keyed by depressing key labelled "1" in column SK1 and key labelled "£" in column SK2. If reference is now made to FIG. 28 it will be seen that the line f connected to one side of the open contacts of relay OUR must be marked before potential can be applied through the OUR contacts and the OTR contacts via line MS to line MSW the normally closed fifth contacts of relays FR and ASK (FIG. 7), and thence to one side of the contacts of the manual motor switch MS on the keyboard (FIG. 2).

When odds key "No" closes its contacts 10 relay OTR of FIG. 28 is operated through line OTR by potential applied from the other side of contacts 10 through line 00. The line 00 normally carries marking potential through the normally closed lower contacts of the third group of relays of FIG. 21 and the first contact of relay 1HL in the second group of relays. Key "6" of column OK2, when depressed, operates relay OUR of FIG. 28 through its contacts 10 by transferring the marking potential previously explained to be on line 6Y over line M and through the upper contacts of the B winding of the SPEC R relay (FIG. 27). Also depression of key "—/1" in column OK3 transfers the potential applied on line —/1LL through the normally closed lower contacts of four of the relays in the group shown in FIG. 27 to line X/1 and thence to line M/1 (FIG. 2) to operate relay M/1 in FIG. 29. Also with the depression of key "1" in column SK1 potential is applied to the relay 1, FIG. 29.

In the instance of the odds at present under consideration the two uppermost contacts of relay M/1 and the second contacts of relay 1 are relevant from which it will be seen that potential applied to line b1 through operation of relay M/1 is connected to line 50M (FIG. 21) through the normally closed second contacts of relay 1HL through the normally closed second contacts of relays 2HL, 4TL and 5TL and the normally closed fourth contacts of relay 2TL to line M1C8 which in turn through the now closed seventh contacts of relay M/1 (FIG. 29) applies potential to line C8. This marking potential is thus transferred through the normally closed second contacts of the relays 16, 8, 5, 4 and 2 to line C through the now closed second contacts of relay 1, and through this line to mark one side of the contacts 10 associated with key "£" of column SK2 on the keyboard.

Therefore, when this final key "£" is depressed according to the final keying operation by the operator of the wager, the potential from line C is connected to line F which is extended to one side of the contacts of the OUR relay in FIG. 28. Thus due to the operation of both this relay and the OTR relay potential is applied to one side of the motor switch MSW on the keyboard to permit printing of the betting ticket at the will of the operator by depression of key MS.

In a similar manner a wager may be registered and a betting ticket printed utilizing the available special betting odds of 50 to 8. In this case by depression of the key "50" of the column OK1 relay O/50 is operated via the key contacts 9. The contacts 10 associated with the key "50" are effective only in the case where the key is used for registering conventional odds of 50 to 1. In such instances similar odds of 50 to 1 will have been signalled from the control unit resulting in the operation of relay 5TL in the third group of relays in FIG. 21. However, as the present example concerns the special betting odds of 50 to 8 the line 50 in the first set of contacts of relay 5TL is disconnected from marking potential and thus, as stated, the contacts 10 of this key are non-effective. Depression of key "0" in column OK2 brings into operation relay OUR as a result of potential now applied on the OY line through the marked line —/1LL and the first contacts now closed of relay O/50. Also with the operation of relay O/50 resulting from the depression of key "50" the SPEC R relays are operated through the second contacts of the relay and through its third contacts the potential on line 6/1 is applied to line X/8 which is in turn led to one side of the contacts 10 of the key "—/8". With this key now depressed the potential is transferred to line N/8 and through the now changed-over third contacts of the B winding of relay SPEC R connects potential to line TM+ shown associated with one side of the contacts 10 of the four uppermost keys in column SK1 of FIG. 2 which are the only keys in this column which may be used in connection with the special betting odds. Let it be assumed that the bet is to be placed in pounds and once only, which will require depression of key "£" in column SK1 and key "1T" in column SK2. Depression of the former key effectively connects the marking potential of line TM+ to one side of the contacts 10 and the five uppermost keys of column SK2. Thus depression of key "1T" places this potential on line 1T which through the normally made fifth contacts of relay O/400 (FIG. 27) provides potential through line F, the OUR relay, now operated and relay OTR, operated by change over of the fifth contacts of the right hand SPEC R relay, to the motor switch MSW on the keyboard shown in FIG. 2. Hence it will be seen that the safeguard is effective in preventing registration of an incorrect wager while permitting normal functioning of the keyboard machine if a wager is placed at the odds signalled from the control unit or at the corresponding special betting odds, as indicated at the indicator lamp panel.

In the circuitry shown in the drawings provision has also been made to prevent marking potential being applied to line F if the value of the stakes keyed on the keyboard at the correct odds is so great as to lead to a potential winning sum for the customer in excess of £280. The maximum winning sum for each wager is limited where possible to about £200. For instance, wagers such as £40 at 5/1 and £50 at 4/1 and even £40 at 7/2 may be freely registered but if these stakes should be increased beyond this limit then no potential will be available for operation of the ticket printing mechanism. The circuit, of course, may be modified to impose a limitation of a different value.

It should now be appreciated that relays of the right hand relay group shown in FIG. 29 are energized by depression of a respective one of the six lower keys in column SK1 at the keyboard machine, while the left hand group of relays of this figure respond to operation of the six lowest odds keys of column OK3. One side of the contacts 10 of the five lowest stake keys of column SK2 are commoned to line F so that this line becomes marked upon the depression of one of these keys only if potential is applied to the line $a$ to $e$ individual to the depressed key. The marking of these latter lines is obtained through the expediency of the contacts of the right hand group of relays in FIG. 29.

Should the betting odds available be 5 to 1 it will be readily seen that by the application of potential to line $a8$ through the lowest contacts of relay M/1 the depression of any one of the stake keys "16", "8", "5", "4", "2" and "1", with consequential operation of their respective relays (FIG. 29), will mark the line $a$ feeding one end of the chain of first contacts of relays 16 . . . 1. Thus at these odds any wager is permissible which involves a stake in shillings. Furthermore, the circuit has already been traced which will provide marking of the line C8 feeding one end of the chain of second contacts and subsequently marking of line C irrespective of which stake number key of column SK1 is depressed. Hence any stake in pounds is also acceptable at the available odds of 5 to 1.

However, in order that a stake in excess of £40 cannot be registered it will be seen from FIG. 21 that at the sixth contacts of relay 5UL, now operated, the line M1D8 is broken so that the line $d8$ feeding one end of the chain of third contacts of relays 16 . . . 1 (FIG. 29) is not marked. However, marking of line $d4$ in this chain is effected by the changeover of the fifth contacts of relay 5UL (FIG. 21). This potential is derived from the circuit of the now closed fourth contacts of relay M/1 (FIG. 29) to line M1+, via sixth contacts of relay 1TL and fifth contacts of relays 2TL and 5TL to line U+, through fifth contacts of relay 1UL, fourth contacts of relay 2UL, fifth contacts, now changed over, of relay 5UL, to line $d4$ via the normally closed sixth contacts of relay 4UL.

With reference now to the chain of third contacts in the right hand group of relays of FIG. 29, it can be seen that marking of line $d4$ will permit its potential to be connected to the $d$ line only if contacts to the right of line $d4$ in the chain are moved. In other words only operation of relay 4, 2 or 1 will effectively provide potential to line $d$ which is associated with the contacts of stake key "£0" of column SK2 (FIG. 2), while operation of relay 5 leaves the line $d$ unmarked. Hence at odds of 5/1 a betting ticket may only be printed which involves a stake of £40 or less value. By the same arrangement a maximum stake of £50 at odds of 4 to 1 may be accepted.

The above described arrangement is equally effective where fractional odds are involved. In such instances operation of a different one of the relays at the left hand side of FIG. 29 will be effected respective to the denominator of the fractional odds. Furthermore, the signalling lines interconnecting the circuits of FIG. 29 and FIG. 21 will be $x\ 5/9$ and/or $x\ 5/7$. For example if odds 9 to 4 are ruling then relay $m/4$ will be operated when the wager is keyed and line $x\ 5/9$ will be marked. However, if say odds of 7/2 or 5/2 are ruling then both lines $x\ 5/9$ and $x\ 5/7$ will become marked while relay $m/2$ will operate. As a point of interest it will be observed from the circuitry of these figures that with odds of 7/4 the line $d16$ is marked to provide for a maximum stake of £160.

The amount liable to be won by the customer on this wager is the extreme permissible maximum amount of £280 according to the present circuit arrangement.

It will also be seen that at those conventional odds approximating the special wagers offered no provision has been made in the circuit corresponding to that described above. In fact, the maximum limit on stake value at these odds is comparatively low. This has been done deliberately since it is intended that large wagers at these odds should be placed as special wagers. For instance, instead of placing £30 at 6 to 1 a special wager taken four times at 50 to 8 will be effectively £32 for a win of £200 which is at slightly greater odds than the former bet. A maximum limit of liability on such a bet is facilitated by limiting the number of times such as a bet may be taken.

*Fault localization in apparatus*

As a further feature of the apparatus provision may be made for indicating visually at the control unit faulty conditions which may arise in the "pay" accumulators and the common "take" accumulator as well as other equipment located in the control unit. Together with this feature may also be incorporated means for locking up the entire apparatus so as to prevent the reception at the control unit of subsequent wagers made at any keyboard machine, pending removal of the faulty condition.

To this end a tell-tale lamp panel T is provided on the bay frame B (FIG. 1) or other suitable position at the control unit. This panel mounts a series of lamps labelled according to the respective circuit to which they are connected, for example, see FIG. 30. A pair of individual lamps is provided on the panel for each keyboard machine, one lamp of which pair indicating by its illumination that a wager has been keyed on the respective machine and is awaiting registration at the control unit. The other lamp of each pair, by its illumination, indicates which particular keyboard machine is being answered, i.e. is having its wager registered at the control unit. These lamps may be connected to an appropriate part of the uniselector C55 contacts or wipers (FIG. 9) so as to respond to the application of marking potential on the contacts and the position to which the uniselector has stepped around its contact banks. A further column of lamps are provided on the panel as shown, each of which is individual to a separate pay accumulator and is connected in circuit with the input relay of the respective pay accumulator. It will be appreciated, therefore, that with the operation of a pay accumulator input relay, only one of which is operated at any instant, the respective lamp indicating that accumulator will be illuminated.

With reference to FIGS. 31 and 32 which shows two trains of relays with interconnected contacts whose outputs are applied via line STR or line PR to the winding and contacts, respectively, of relay STR. A first train shown in FIG. 31 has an output result shown by the marking condition of line STR applied to operate relay STR. A second train of relays is shown in FIG. 32 whose interconnected contacts have a common output to line PR at the left hand end of the train, which line is connected to one side of all of the normally open contacts of relay STR. Thus, when the output lines STR and PR are marked potential is applied through the relay STR contacts, now closed, to lines FR and FRL. It is the normal condition if the apparatus is functioning correctly, that a potential appear on both lines FR and FRL upon completion of registration of each wager in the control unit. The line FRL is connected to an "all clear" lamp on the lamp panel of FIG. 30 while the marking potential of line FR operates relay FR shown in FIGURE 7 which in operating removes the potential applied through its uppermost contact serving to hold the ASK relay. This ASK relay thus releases and removes the marking potential from the control uniselector C55 (FIG. 9) to allow it to step on and accept a wager offered by another keyboard machine. The power connection to the motor switch MSW on the keyboard is also broken through the disconnection of the line MS from MSW so that printing of a betting ticket at the keyboard machine from which the wager has just been received is now prevented until a further wager is keyed up.

Referring again to FIG. 31 it will be seen that the relay train is composed of pairs of relays identified by the letter T or TR. The T relays are connected directly to the input lines of the take accumulator, or in other words to the output of the decoder unit (FIG. 13). If, for instance, the take line 5T is marked, thus indicating an amount of £5 take, relay 5T is operated which connects potential from the potential line at the fourth and fifth contacts of the relay through the normally closed second contacts of the preceding relays in the train, but is interrupted by the change over of the second contacts of relay 5T and the normally open contacts of relay 5TR and thus prevented from passing to the output line STR.

Two further separate columns of lamps are also provided on the lamp panel (FIG. 30) one column containing lamps which are alternately labelled 1T, 2T, 4T . . . 400T interspersed by lamps labelled 1TR, 2TR, 4TR . . . 400TR. The upper change-over contacts of all of the relays in the group shown in FIG. 31 are connected at their normally open sides to lines which are in turn connected to respective T or TR lamps on the lamp panel.

Thus with the operation of relay 5T potential is applied by its now closed upper contact to line 5TL to illuminate the lamp 5T thus indicating that the 5T input to the take accumulator has been marked as a result of a signal received from the keyboard machine. The particular keyboard machine transmitting the signal can be ascertained by viewing the indicator lamps on the lamp panel providing this information.

The TR relays of the relay train are connected directly to the PR lines at contacts 4C (FIG. 35) of the special relays in the take accumulator. If a signal is successfully received and registered in the accumulator, potential will be applied to the PR line (contact 4C, FIG. 35) corresponding to the particular input line marked. That is if the 5T input line is marked to indicate a stake of £5, and the signal associated with this stake is successfully registered in the accumulator then the 5TR relay becomes operated. With operation of the 5TR relay the lamp 5TR is illuminated through potential applied through the upper contacts of the relay to the line 5TRL. Also by closure of its third contacts the marking potential passing through the now changed over contacts of 5T is connected through the normally closed, second contacts of the subsequent relays in the train to the output line STR to operate the relay STR.

The second group of relays, shown in FIG. 32, connected to an output line PR, functions in a similar manner but energizing potential for the relays is derived from the input to the particular pay accumulator functioning at any instant. A single train of relays as shown by FIG. 32 will suffice for fault location in any of the contestants' pay accumulators. It will be appreciated now that all of the P relays of this second train are commoned with the lines of all the input relays of the pay accumulators of which there will be a number as many as there are contestant numbers available in the apparatus.

In a similar way to that already described the PR lines (contacts 4C, FIG. 35) of all pay accumulators are connected to the PR relays. Furthermore, the second column of the further two columns of indicator lamps on the lamp panel of FIG. 30, correspond alternately to the P and PR designations of the relays of this second group. Thus, if the output of the multiplier should amount to £2 the relay 2P is operated which illuminates the lamp labelled "2P." Should the signal be sucessfully registered in the appropriate pay accumulator the relay 2PR also becomes energized so as to light the lamp "2PR" and provide a connection through the first and second contacts of both relays 2P and 2PR for the potential line to the output line PR.

From a consideration of the above description of this equipment it should now be apparent that if both the common take accumulator and the pay accumulator individual to the contestant number on which the wager at the keyboard machine has been made, have both successfully registered the wager signalled, the two pairs of lamps 2P, 2PR and 5T, 5TR (should these amounts be thus involved in the wager) will light and potential will be applied to the line FR through the contacts of the relay STR. Also an "all clear" lamp will be illuminated on the lamp panel (FIG. 30). In this way the control unit is disconnected from the keyboard machine which has just completed signalling and immediately hunts for the next machine in its progression sequence at which a wager is awaiting registration by the control unit. On the other hand, if the signal is not successfully registered in either accumulator associated with the particular wager, no marking potential is applied to the line FR and thus the control unit remains connected with the signal initiating keyboard machine and no further signals can be received by the control unit. The location of the particular fault can be readily ascertained by a reading of the lamps illuminated on the lamp panel (FIG. 30). With the substitution of fresh equipment or the elimination of the fault the clear signal will then be sent through marking of the line FR so that betting transactions may continue.

Accumulators

From the foregoing description it should now be clear that numerous accumulating registers are provided, hereafter referred to simply as accumulators, one of which registers the "take" in respect of all stakes wagered on the contest, regardless of the contestant number, and a plurality of identical accumulators each of which is individual to a different contestant number so as to register the total "pay," being the total of the collect amounts payable on every wager laid on the respective contestant. The total registered at any time in the take accumulator is preferably connected to a conventional lamp indicator whereby the value of the total "take" is displayed in illuminated numerals which are constantly increasing in value as the betting transactions proceed. The output of each "pay" accumulator is preferably connected to the jack labelled "pay output," of the odds and profit panel (FIG. 19) corresponding to the respective contestant number. A further lamp sign, preferably located adjacent the "take" display sign, may be connected to display the total "pay" registered in an accumulator for a selected contestant number, by insertion of a solid plug in the jack "pay output" of the particular contestant number. This facility will thus enable the bookmaker at the control unit to make a speedy comparison of the take and respective pay mounts, which, it will be seen provides a check upon the correct functioning of the profit lamps of the respective panel shown in FIG. 19.

For ease of maintenance on the accumulator equipment and for ready replacement of faculty units with a minimum of delay, all of the accumulators are interchangeable. Any suitable equipment may be used, other than the lamp indicators referred to, for the purpose of providing an instant reading of the total money values stored in the accumulators.

The accumulator about to be described is novel and has numerous advantages over other known equipment which could be used for the purpose. A very important element of these accumulators is a double-action relay of a type described in United States Patent No. 2,558,067 filed on April 5, 1949, by Roy E. Wells. A diagrammatic view of this kind of relay is shown in FIG. 33 of the present drawings and its operation is described briefly as follows.

Two separate confronting solenoids N and F are shown having a common plunger 14. To the right of the solenoids distributing contacts 7C and 6C are shown while on the other side thereof sets of holding contacts 3C and 2C can be seen. Members 16 and 17 are U-shaped brackets having inner bifurcated ends 18 and 19 with insulated actuating rollers 20 and 21, serving as striker arms, on their ends which move to change-over the distributing and holding contacts in a way to be described. Transverse arms 24 and 25 are fixed to the outer end of the member 17 which are engaged at their ends by loop springs 26. A stud 15 held in a slot in the plunger 14 passes through the forked ends of the lever members 16 and 17 with the end 18 of the lever 16 a reasonably close fit thereon, while the end 19 of the lever 17 has its fork portions spaced wider than the diameter of the stud 15. After one or the other of the solenoids N or F have been energized and then de-energized, the spring contacts 6C and 7C restore the plunger 14 to the position shown in FIG. 33. This is the condition of rest of the relay. However, due to the action of the loop springs 26 on the lever 17 as well as the excessive width of the forking of its end 19 the lever 17 will be biased to one or another over-centre positions from which it must be forceably displaced by an opposite movement of the plunger 14. This displacement is delayed behind the movement of the distributing contacts because of the spacing of the stud 15 from the forked ends 19 of the lever 17.

FIG. 34 shows a schematic circuit representing the double-action relay as used in the accumulator circuit, shortly to be described, but with the relative positions of the striker arms reversed, i.e. on opposite sides of the windings. In this figure the symbol $=$ is used to represent the striker arm 20 associated with the distributing contacts 7C and 6C and the symbol $$\overset{\uparrow}{=}$$

to represent the contact striker arm 21 associated with the holding contacts 3C and 2C which are those appearing in a vertical line through these symbols. As shown in FIGS. 33 and 34 the striker arm associated with the holding contacts is assumed to be in one of its biased positions, which is referred to later as the zero position of the relay. It will be seen that the impulse line providing an input to the relay is connected in parallel to the contacts 6C and 7C and via the latter is also connected through contacts 2C to the N winding which thus will attract the armature 14 in that direction thus reversing the 6C and 5C contacts of the striker arm $=$ so potential is now applied from the input line through contacts 6C directly to the winding N of the relay. As the plunger 14 nears the limit of its travel it displaces the striker arm $$\overset{\uparrow}{=}$$

to its other biased position which may be represented by the symbol $$\underset{\downarrow}{=}$$

which in turn reverses all of the contacts 1C to 4C. The potential on the input line, it will be seen, continues to be applied to the winding N through the contact 6C until the potential ceases, at which time the striker arm $=$ returns to rest as shown in FIGS. 33 and 34 but the striker arm $$\overset{\uparrow}{=}$$

remains in its last position.

From an appreciation of the operation of this double-action relay it will be understood that the contacts 2C, 3C, 6C and 7C are utilized for energization of the windings N and F, and the remaining contacts 1C, 4C, 5C and 8C may be utilized for the control of remote circuitry. If a further pulse is received on the input line it will be applied via contacts 6C and 3C, now closed, to the winding F which will cause changeover of the striker arms in a manner similar to that described so that continued energization of winding F is assured before contacts 3C break. When this second pulse is removed from the input line the striker arm = will restore to rest and the relay shall then have completed a full bimotional sequence and be restored to its zero position.

If reference be now made to FIG. 35 a number of the double-action relays above described will be seen to be interconnected. The relays ½B&TR, 1B&TR, 2B&TR and 4B&TR are similarly constructed to those described above excepting that the distributing contacts and associated striker arm have been deleted. The remaining relays are identical with the type already referred to. The accumulator shown in the drawing, by way of example, is a pay accumulator for a particular contestant number, say contestant No. 1, and thus is provided with an input relay having windings A and B which will be operated as the result of the No. 1 contestant keys being depressed at a particular keyboard machine which has subsequently obtained a signalling path to the control unit. Hence, the windings A and B of this input relay receive potential from the marked line 1HP from FIG. 8, and the lines terminating at the contacts of this relay are the pay lines from FIGS. 15 and 16. In order that moderately high total money values may be registered by the accumulator it must necessarily contain a number of sections each of which may be similar in construction. FIG. 35 shows one such section which will respond to marking potentials on the lines ½P, 1P, 2P and 4P thus registering corresponding money values of £½, £1, £2 and £4. The relay ¼BCR has been included merely for illustrative purposes to show how the equipment may be extended for registering pay units of a lower money value. The double-action relays shown are interconnected to form a relay train which terminates in a stepping switch or uniselector switch designated £4 UNI. It will be seen that the relays mainly are grouped in sets of three each set being individual to a different money unit. In the present example of the accumulator the section shown will effectively add the smaller denomination pay values and alternately pass them into the following set of relays associated with the next higher denomination value. It will be seen that the denominations of the money values corresponding to the various inputs to the equipment section are multiples of each other. Furthermore that the relays have a binary movement. Therefore, the arrangement is a binary storage system where the input of a first money unit of any denomination is stored by the off-zero condition of a relay (in this case relay ½C1R, 1C2R or 2C4R) and a further similar input returns the relay to zero with the transmission of a signal to the succeeding set of relays signifying a single money unit expressed in terms of this higher denomination. The switch £4 UNI serves to interconnect this section with the following section of the accumulator.

When a particular pay value has been received and stored in the accumulator by an alternation of the relevant conditions of its relays and/or uniselector switches, disconnection of the keyboard machine originating the wager registration is effected and indication of the registration is provided by the marking of a line, which, if desired may be associated with a visual indicator for the bookmaker. It is preferred that a visual indication be incorporated in the equipment in order that the automatic computation of the betting transactions may be checked, and also that the actual money value stored in the accumulator may be ascertained readily in case substitution of an accumulator unit should be desired. In such a case the fresh unit may be manually adjusted to the same setting prior to insertion in the apparatus.

So that a better understanding may be obtained of the acumulator section shown in FIG. 35 and interconnection of sections shown in FIG. 35A, it will be assumed that a total pay value of £3½ in three separate units is to be registered in the accumulator of this, the No. 1, contestant. In such an event the input relay will be operated by marking of the line 1HP and potential will also appear on the contacts ½P, 1P and 2P which, now closed, will apply this potential to the input lines ½B, 1B and 2B. The line ½B, it will be seen, is connected through contact 3C of relay ½B and TR and contacts 7C and 2C of relay ½C1R to its N winding, assuming that the striker arm $$\uparrow \atop =$$

of this relay is in the position indicated, which is its zero or reset position. It will also be seen that potential on the line ½B is applied to the winding F of relay ½B&TR which serves to hold this relay in the condition shown even should potential be applied to its winding N. The relay ½C1R becomes operated with firstly movement of striker arm $$\uparrow$$

thereby changing over contacts 6C and applying through them the marking potential directly to the winding N before the striker arm $$\uparrow \atop =$$

moves to open contacts 2C. The N winding continues to be energized to attract the striker arms while the marking potential persists on the line ½B which will be for as long as the originating keyboard machine is connected with the control unit. Contacts 1C and 5C of relay ½C1R are now closed and potential is applied via these contacts to the presently closed contacts 4C of relay ½B&TR to mark the indicator output line ½PR. The marking of this latter line, as previously described in connection with FIGS. 31 and 32, provides a visual indication at the control unit that registration of the respective pay value has been effected and should a similar indication be given from the common "take" accumulator the relay STR (FIG. 31) is energized to operate the release relay (FIG. 7) thereby enabling disconnection of the signalling keyboard machine from the control unit. Furthermore, potential is applied via contacts 1C of relay ½C1R to a lamp circuit labelled "½B/T," which preferably includes a B/T relay. Although disconnection of the keyboard machine has been described, it should be remembered that this occurs only if the signal on the ½P line is the last to be registered in the accumulator. Reference to FIGS. 31 and 32 will show that the line PR is not marked until all pay values signalled have received corresponding PR signals from the accumulator.

It will thus be seen that the pay value of £½ has been registered and stored in the accumulator by a change from one condition to another in the relay ½C1R. In a similar manner the pay values of £1 and £2, corresponding to the marked 1P and 2P lines have also been stored in the relays 1C2R and 2C4R, respectively. By the closure of the contacts 1C of these relays the 1B/T and 2B/T lamps may be illuminated. With disconnection of the signalling keyboard machine the input relay will be released and the marking potential on the pay lines will be removed. Hence, the N windings of the ½C1R, 1C2R and 2C4R relays will be deenergized and the contacts associated with the striker arm $$=$$

restored to the normal position shown in FIG. 35, but the contacts associated with the striker arms $$\uparrow \atop =$$

will be off-normal and thus reversed to the position shown in the drawing. Now, by an addition of the values indicated by the B/T lamps it will be seen that the accumulator is storing a total money value of £3½.

Assuming that a further total pay value of £3½ signalled in three units is received at the input relay to the accumulator, similar functioning of the circuit will be involved excepting that the F windings of the upper relays ½C1R, 1C2R and 2C4R are now energized with consequential attraction of the striker arms

= and

↑
= of these relays in an opposite direction to that described previously. Simultaneously with application of potential to contacts 7C of relay ½C1R after the winding F has been energized, potential is connected through the normally closed contacts of relay RSRC to the N winding of relay 1CHR across the now closed contacts 7C and 2C of this relay. The relay 1CHR is, in effect, a carry-over relay and operates similarly to those described above. After the striker arm

↑
= of this relay has changed over to close contacts 3C and 4C potential is applied via contacts 5C and 4C to the winding N of relay 1B&TR which causes the striker arm

↑
= of this relay to be moved downwardly and close its associated contacts 1C and 2C. Potential is now applied over contacts 5C and 3C of relay 1CHR and contacts 2C of relay 1B&TR to the contacts 6C and 7C of relay 1C2R thereby effecting registration in this latter relay of a further £1 money unit. Additionally, however, due to the now closed condition of contacts 1C of relay 1B&TR potential is applied from one side of its contacts 4C and through 1C to the F winding of relay 1CHR to restore same to its zero condition. As should now be clear the potential derived from one side of the contacts 4C of relay 1B&TR may be supplied across the contacts 1C and 5C of relay 1C2R or the contacts 5C of relay 2CHR. Thus, as a result of the second operation of relay ½C1R it has restored to its zero position but passed on the total value of its two input pulses as a single pulse representing a higher denomination value through the carry-over relay 1CHR and the transfer relay 1B&TR to the binary relay 1C2R which is next highest in the progression sequence of the relay train. Thus the relay ½C1R is ready to accept further respective pay values.

Simultaneously with the above noted functioning of the 1C2R and ½C1R relays, relay 2CHR functions in an identical manner with a resultant operation of relay 4CHR. The operation of this latter relay causes potential to be connected via its contacts 5C and 3C and contacts 2C of relay 4B&TR to operate the coil of the stepping switch £4 UNI. As shown in the drawing this is a five bank switch which preferably has twenty-five contacts in each bank but only the first six are shown, the first of which is a home position for the switch and the wiring of the following five is repeated for successive groups of five contacts.

The foregoing description in respect of the accumulator equipment has been exemplified by a single section of an accumulator which includes a uniselector switch to which is applied signals respective to a particular money value. It has been seen that different inputs to this section may be applied which correspond to different money values which are multiples of each other. Through the arrangement of the double-action relays the signal corresponding to a smaller money value is accumulated and converted into circuit conditions corresponding with money values expressed in succeedingly higher values. For example, the receipt of three separate money units corresponding to £1 in value will be accumulated and converted by the 1C2R and 2CHR relays into a single money unit corresponding to £2 in value, with the relay 1C2R finally in an off-normal position to signify registration of the £1 balance. An application of further input signals of £1 in value to this section of the accumulator will subsequently result in a condition in the relay train signifying a betting unit of £4 in value, and this will then be applied, by means of a marking potential to the input of the uniselector £4 UNI.

With the receipt of such a signal, or signal fed directly from the £4 unit input of the accumulator section, the uniselector ensures that potential is applied back through the contacts 1C, now closed, of relay 4B&TR, if the originating signal corresponds to an accumulation of smaller money values, to operate the F winding of relay 4CHR thus restoring it to its zero condition. On the other hand, if the originating signal to the uniselector is derived directly from the £4 unit input of the circuit the marking potential from the uniselector is applied directly across the contacts 4C, now closed, of relay 4B&TR to the line 4PR thereby effecting disconnection of the keyboard machine from which the wager values have originated.

The uniselector £4 UNI is a conventional telephone type unit having interruptor contacts Z and being a reverse operating type uniselector, i.e. it steps from one level of contacts to another upon release of the energizing potential. It has a pair of contacts RC which close upon energization of the switch coil. It has five wipers A to E which in the home position of the switch stand on the first level of contacts in the banks. It will be seen, when potential corresponding to a £4 value unit is applied to the coil of the switch the contacts RC close and potential applied to the first contact in the fourth bank is led by the wiper D to either the 4PR line of relay 4B&TR or the F winding of relay 4CHR, as should be clear from the above description. As previously explained this potential results in disconnection of the potential applied to the switch coil, and hence the switch steps on to the second level of contacts. The A wiper of the switch in every off-normal position thereof is connected to one side of a pair of resetting relay RSR contacts which may connect potential for zeroing purposes but are normally open. These contacts are associated with the same relay as the RSRC contacts in the output of each of the relays ½C1R, 1C2R and 2C4R relays, and when operated reset the uniselector to its normal home position. The potential from the contacts RSR is applied through the interruptor contacts Z of the switch to obtain continuous stepping when the switch is homing. Through the B wiper of the switch potential is applied to a line 4B/T to illuminate a lamp 4B/T to provide visual indication on the control unit of registration of a £4 money unit.

The wipers D and E of the switch £4 UNI, in any of the second to fifth contact levels of the switch, contact lines 5CB and 5CH which are associated with a relay 5CHR (see FIG. 34) which is situated at the bottom of the train of relays in the succeeding section B of the accumulator. The line 5CH is an input line of the relay 5CHR similar to ½CH of relay ½CHR while the line 5CB is connected to the value recorded signalling line connected to the contacts 1C of the relay 5CHR similarly to line ½CB of relay ½CHR. As previously explained the B section of the accumulator is similarly constructed to the A section but provides for the registration of signals corresponding to input units of £5, £10, £20 and £40 denominations.

Let it be supposed that the switch £4 UNI is now standing upon its second level of contacts and a signal corresponding to a £4 money unit is applied to its coil. This potential is also applied across the E wiper to the line 5CH and is subsequently registered in the relay 5C10R of the B section of the accumulator. When this has occurred a return signal is sent back along the 5CB line across the D wiper of the £4 UNI switch and the contacts RC, now closed, to the release line associated with relay 4B&TR. Release of the signalling keyboard machine then enables the switch to step on to the third level of its contacts where it will now be seen potential is applied to the lines 1B/T and 2B/T to provide an indication of the registration of £3 total money value in the A section while operation to the off-normal position of relay 5C10R in the B section has visually indicated registration of £5 money value. The total registration indicated is thus £8 which is consistent with the receipt of the two £4 units by the uniselector. Similarly, the switch £4 UNI visually indicates £2 or £1 money value registration when standing upon its fourth or fifth contact levels, simultaneously with £10 or £15 total indication of money value registered by the B section, thus providing the bookmaker with a total indication, respectively, of £12 or £16 when three or four £4 units have been signalled to the £4 UNI switch. It should now be clear that while this switch is standing upon its fifth contact level and a fifth impulse corresponding to a total input of £20 money value is received, a fourth pulse is sent to the B section of the accumulator and after release of the connection with the keyboard machine the switch £4 UNI steps onto the sixth contact level which has contact connections similar to the home position of the switch excepting for the first bank through which homing potential may now be provided.

For most uses of the apparatus an accumulator having a maximum registration capacity of total money value in the vicinity of £100,000 will suffice. The capacity can be provided by equipment having three sections similar to that described with reference to FIG. 35, together with a final section to accept the output signals from the uniselector switch of the C section. This final section is shown schematically in FIG. 36 where it will be seen that a single interconnected group of three £500 relays have their output connected to a serial connection of two uniselector switches designated £1,000 UNI and £5,000 UNI. Should these two latter switches be provided with banks of twenty-five contacts they will be capable of registering a total value of £124,000.

The input to the 500CHR relay of this final section is connected to the fifth bank of a £400 UNI switch which is the uniselector associated with the C section of the accumulator. The release signalling line from the 500CHR relay of FIG. 36 is connected to the line 500CB of the same switch. Thus, with the second registration of a £400 money unit in the £400 UNI switch the potential associated with this unit is applied to the input of the 500CHR relay and upon registration of this unit in the 500C1000R relay via the transfer relay 500B&TR, the £400 UNI switch provides visual indication at the control unit of £300 total registration in the C section while from the final section of the accumulator a visual indication corresponding to £500 will also be provided, thus correctly indicating the total registration of £800.

Referring to FIG. 36, in the final section of the accumulator a positive pulse is applied via the output line RB through the normally closed contacts RSRC of the zero reset relay to the operate winding of the £1000 UNI switch while a registration return signal line RC connects the said switch back to the 500C1000R relay. When this relay has performed its binary action and transmits a pulse to the line RB to signify a £1000 money unit, the switch £1000 UNI closes its contacts RC to connect potential via the RC line for the disconnection of the potential applied over the RB line, and the switch £1000 UNI steps onto its second contact level. In this position its B wiper applies potential to the signal lamp 1000B/T thereby indicating registration of £1,000 by the switch. The switch will function similarly on its second, third and fourth contact levels so that when four such pulses have been received by its coil and then disconnected, its five wipers shall be standing upon the fifth contact level with illumination of lamp 4,000B/T. In this position of the switch the D and E wipers are connected, respectively, to potential through the contacts RC, when closed, of the £5,000 UNI switch and to the input coil of this switch. Therefore, when a fifth pulse is received by the first uniselector £1,000 UNI the other uniselector £5,000 UNI is energized, firstly to return signalling potential along the line RC back to relay 500C1000R and then to step onto its second contact level to visually indicate registration of £5,000. The remaining levels of contacts in the switch £1,000 UNI are arranged in groups of five and each group is similarly wired as the wiring shown in FIG. 36 for the first group of five levels. The first level in the second group of five levels is shown as the sixth level of this switch in the drawing. It will be seen now that with each binary operation of the relay 500C1000R the switch £1,000 UNI is caused to step on to register an additional £1,000 with a maximum possible registration in this switch at any time of £4,000. Consequently, after every fifth energizing pulse applied to the switch £1,000 UNI the second switch £5,000 UNI receives a pulse, so that it will be seen to register £5,000 money units. In the drawing nine levels of contacts of this latter switch are shown but with similar wiring applied to the remaining sixteen levels of contacts a maximum registration capacity of this switch of £120,000 is possible. If desired additional uniselectors may be utilized in order to provide a greater maximum capacity for the accumulator.

From the above description it should be clear that provision has been made for accepting input money units ranging from £½ through £1, £2, £4, £5, £10, £20, £40, £50, £100, £200, £400 and £500 denominations. These money units, of course, correspond with the respective pay lines shown connected to the input relay of the accumulator. Where, it is desired to provide for a greater number of different input values, that is beyond the maximum present unit of £500, additional relay groups similar to that shown in FIG. 36 may be cascaded with the input of the uniselector £5,000 UNI and the uniselector £1,000 UNI would then be dispensed with. By any known means all the uniselector switches excepting the switch £5,000 UNI have provision for homing when they reach the limit of their forward movement. However, it is possible for a fully rotating switch to be used.

FIG. 37 shows diagrammatically the layout of an accumulator tray having A, B and C sections and a final section having a group of three £500 relays. The uniselectors belonging to the four sections of the accumulator are shown in the upper portion of the tray and the double-action relays are arranged in order from right to left and from top to bottom in their groups of three, or less, in two levels beginning with the single £¼ relay, the three £½ relays, £1 relays and £2 relays, the two £4 relays and three £5 relays in the first layer. The second layer in the tray consists of the relay groups associated with each of the money values from £10 to £400. The £500 relays are mounted in line at the left hand end of the upper layer of relays. The reset relay for zeroing all relays of the accumulator, the input relay, if the accumulator is in fact a pay accumulator, and output relay windings provided for operation of the B/T lamps are assembled in spaces on the tray left vacant where only one or two relays of the normal group of three is provided.

Whereas the foregoing description of FIGS. 35 to 37 is in respect of an accumulating and storing register for storing values which are applied to it in terms of a code having four elements, codes having a far greater number of elements may be utilized. In such a case of course there will be one less double-action relay, i.e., relay ½C1R, 1C2R etc., or other suitable bi-stable device than there are elements of the code. This circumstance arises due to the connection of the highest order of the code elements to the stepping switch, or other suitable, counting device. Thus, if there are N bi-stable devices there can be N+1 code elements applied.

It should now be apparent that reading-out from each bi-stable device as well as the stepping switch is achieved through the B/T relays and associated indicator lamps. Furthermore, it will be appreciated that one purpose of each stepping switch is a means of converting from a code of one progression sequence to a code of another progression sequence.

A consideration of the description of the function of the stepping switches will also clearly illustrate the fact that the relationship of the two codes between which conversion is effected need only be such that the one of higher order is less than a multiple of the other and differs therefrom by an amount equal to a common factor of both elements.

It will be understood that the mathematical progression used viz. ½, 1, 2, 4, 5, 10, 20 . . . 400, 500 has been selected as the most suitable, but that the progression 1, 2, 4, 8, 10, 20, 40, 80 etc. or a straight out binary progression could have been employed with minor adjustments to the equipment employed. Also electronic tubes could replace relays to perform many of the functions in a well known manner. Relays have been preferred for security reasons because of the large financial risks that would result from even momentary failure of the equipment or from outside interference to which electronic tubes are known to be susceptible.

What I claim is:

1. An apparatus for calculating wagers at advertised betting odds on participants in a projected contest, comprising a plurality of keyboard machines each located at a respective betting position, a control unit positioned at a central location, signalling means located at each keyboard machine; means for selectively linking said signalling means to said control unit, each keyboard machine having its keys grouped to provide for keying and signalling in respect of each wager of information as to the identifying number of the participant, the value of the stake wagered and the betting odds laid, accumulating devices at said control unit responding to input signals to total money values represented by said signals, electrical relay means channeling from each keyboard machine signals representative of the value of the stake of each wager to the input of a first one of said accumulating devices to record the total "take" value of betting transactions, multiplying apparatus responding to two distinct input signals to obtain the "collect" value of each wager, means connecting from each keyboard machine the signals representative of the value of stake and of the betting odds laid to individual inputs of said multiplying apparatus, means for connecting the output of the multiplying apparatus to more than one of said accumulating devices each of which is individual to a different one of the participants in the event on which the apparatus is operating, means responsive to the identifying number of the participant to effect the connection of said multiplication apparatus to a respective one of said accumulating devices to derive therefrom a total "pay" value on each participant, means for reading out of the "take" accumulating device and all of the "pay" accumulating devices to compare in turn each total "pay" value recorded with the total "take" value for adjustment of betting odds on each participant and visual indicating means responding to key manipulation of each keyboard machine to display at that machine the current betting odds on the participants.

2. An apparatus for calculating wagers at advertised betting odds on participants in a contest as claimed in claim 1, including an arrangement for altering the betting odds on a participant automatically in response to increases and decreases at any time during betting transactions in the potential profit to be made by the apparatus in the event of said participant subsequently winning the contest, said arrangement comprising means for obtaining a signal representative of said profit, a signal responsive odds determining device, an alarm unit to provide an indication of the presence of abnormal conditions of said betting transactions, a relaying unit to receive said signal representative of the profit and to send an operating signal to said odds determining device and to said alarm unit, said alarm unit being operated over an energization path having interrupting stages in sequence, and means responsive to said operating signals if successively repeated to indicate continued loss for completing the said path through each of said stages.

3. An apparatus for calculating wagers at advertised betting odds on participants in a contest as claimed in claim 2, wherein said signals representative of different profit values are sent over individual signalling lines, said relaying unit comprising a relay set with relays individual to respective ones of said signalling lines, signalling lines for signals representative of no profit, different amounts of positive profit and of negative profit, a connection for said signalling lines to the windings of their respective relays, the signal line for a signal representative of a low negative profit being connected to its respective relay through contacts of the relay receiving a signal representative of no profit and means for disconnecting said signalling lines after any said signal excepting the one representative of no profit has been received by said relaying unit, whereby no alteration of the betting odds occurs when said potential profit drops from no profit to said low negative profit.

4. An apparatus for calculating wagers at advertised betting odds on participants in a projected contest, comprising a plurality of keyboard machines each located at a respective betting position, a control unit located at a central location, signal generating means actuated by key operation at said keyboard machines, the keys being grouped to signal identity number of the participant, the stake value and betting odds laid in respect of each wager, accumulating devices at said control unit, one of which receives stake value signals from said keyboard machines to record the total "take" value, and others of which receive signals representative of the "collect" value of each wager placed in respect of an individual participant on any keyboard machine to record the total "pay" value on the participants, multiplying apparatus receiving from said keyboard machines signals representative of the stake value and betting odds in respect of each wager and effecting multiplication thereof, the output from said multiplying apparatus being connected to the input of the "pay" accumulating devices, means for manually indicating at said control unit the initial betting odds prior to the commencement of betting transactions, read out means in all of said accumulating devices, subtracting units receiving the output from the "take" accumulating device and in turn being connected to the output of each "pay" accumulating device to obtain the difference between the values of the two outputs, means for registering the difference values in terms of predetermined money units, a relay matrix responding to registration of the difference values automatically to vary the betting odds indicated by an amount corresponding to the number of money units representing the individual difference values, and signalling means for relaying to the keyboard machines the betting odds indicated at the control unit.

5. An apparatus for calculating wagers at advertised betting odds on participants in a contest as claimed in claim 4, wherein signalling of numerical values throughout the apparatus is effected by multiple wires, each wire being identified by an individual element of a code whose elements are representative of values 1, 2, 4 and 5, and a numerical value is represented by a signalling condition on at least one of said wires.

(References on following page)

References Cited by the Examiner

UNITED STATES PATENTS

| | | | |
|---|---|---|---|
| 2,121,164 | 6/1938 | Robinson | 235—92 |
| 2,404,047 | 7/1946 | Flory et al. | 235—164 |
| 2,409,689 | 10/1946 | Morton et al. | 235—164 |
| 2,622,802 | 12/1952 | Handley | 235—92 |
| 2,629,319 | 2/1953 | Handley | 101—66 |
| 2,652,977 | 9/1953 | Levy | 235—92 |
| 2,691,342 | 10/1954 | Johnston | 101—66 |
| 2,917,730 | 12/1959 | Fredericks | 340—213 |
| 2,994,073 | 7/1961 | Pelovitz | 340—213 |

FOREIGN PATENTS

| | | |
|---|---|---|
| 332,189 | 7/1930 | Great Britain. |
| 745,817 | 3/1956 | Great Britain. |

MALCOLM A. MORRISON, *Primary Examiner.*

WALTER W. BURNS, JR., *Examiner.*

J. F. MILLER, *Assistant Examiner.*